Figure 1:
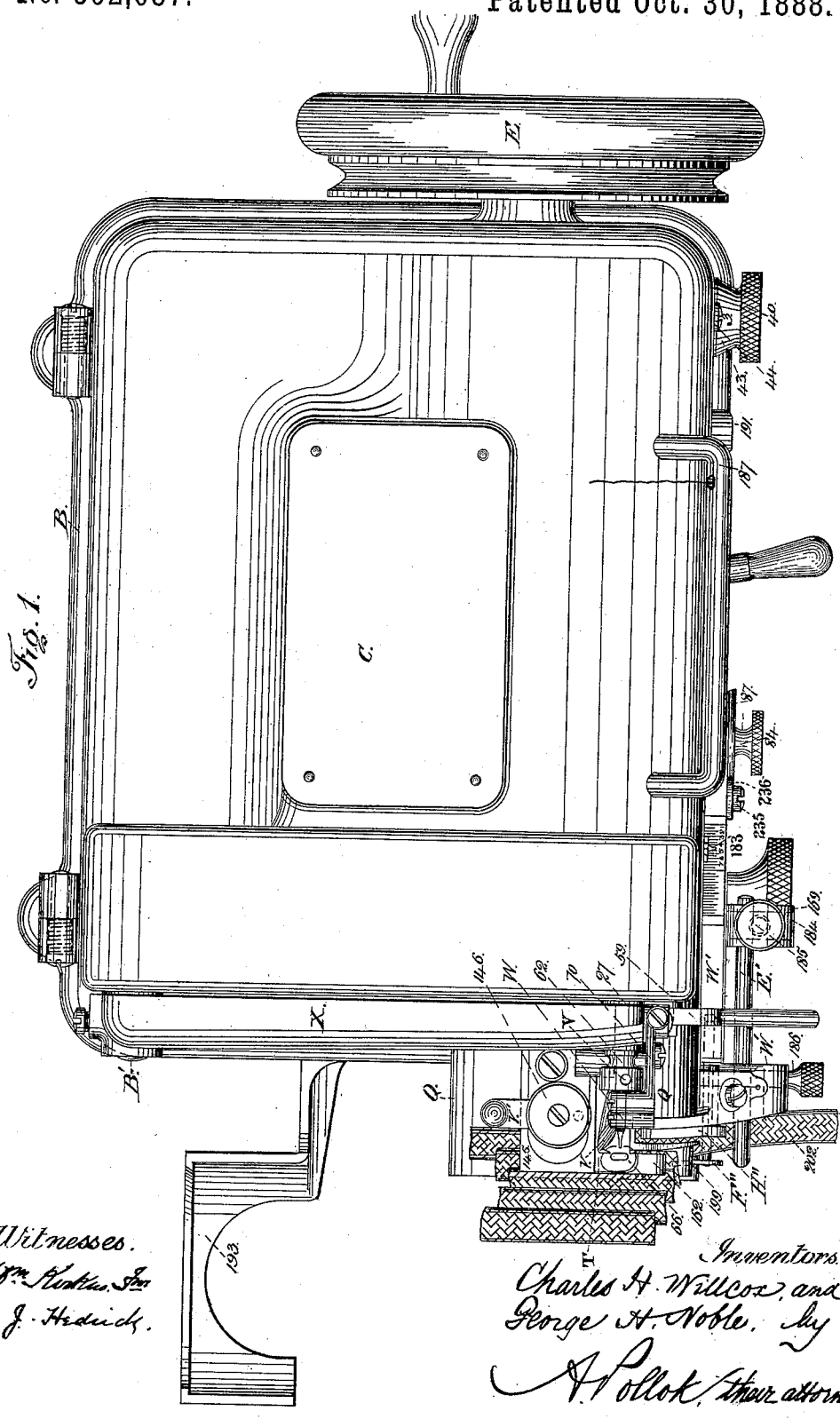

(Model.)  20 Sheets—Sheet 1.

C. H. WILLCOX & G. H. NOBLE.
STRAW SEWING MACHINE.

No. 392,087.  Patented Oct. 30, 1888.

Witnesses.
Wm. Kinkler, Jr.
C. J. Hedrick.

Inventors.
Charles H. Willcox, and
George H. Noble, by
A. Pollok, their attorney.

(Model.)

20 Sheets—Sheet 2.

C. H. WILLCOX & G. H. NOBLE.
STRAW SEWING MACHINE.

No. 392,087.

Patented Oct. 30, 1888.

(Model.)

20 Sheets—Sheet 3.

C. H. WILLCOX & G. H. NOBLE.
STRAW SEWING MACHINE.

No. 392,087. Patented Oct. 30, 1888.

Witnesses.
Wm Kinkles Jr
C. J. Hedrick.

Inventors.
Charles H. Willcox and
George H. Noble by
A. Pollok
Their attorney.

N. PETERS, Photo-Lithographer, Washington, D. C.

(Model.) 20 Sheets—Sheet 4.

C. H. WILLCOX & G. H. NOBLE.
STRAW SEWING MACHINE.

No. 392,087. Patented Oct. 30, 1888.

(Model.) 20 Sheets—Sheet 5.
C. H. WILLCOX & G. H. NOBLE.
STRAW SEWING MACHINE.
No. 392,087. Patented Oct. 30, 1888.

(Model.)

20 Sheets—Sheet 6.

C. H. WILLCOX & G. H. NOBLE.
STRAW SEWING MACHINE.

No. 392,087.  Patented Oct. 30, 1888.

Witnesses.
Wm. Kurkin Jr.
C. J. Hedrick.

Inventors.
Charles H. Willcox and
George H. Noble by
A. Pollok
their attorney.

(Model.) 20 Sheets—Sheet 9.
C. H. WILLCOX & G. H. NOBLE.
STRAW SEWING MACHINE.

No. 392,087. Patented Oct. 30, 1888.

Witnesses.
Wm Kirkus Jr
C. J. Hedrick.

Inventors.
Charles H. Willcox and
George H. Noble by
A. Pollok
their attorney.

(Model.) 20 Sheets—Sheet 10.
C. H. WILLCOX & G. H. NOBLE.
STRAW SEWING MACHINE.

No. 392,087. Patented Oct. 30, 1888.

Witnesses.
Wm Kirkus Jr
C. J. Hedrick.

Inventors.
Charles H. Willcox and
George H. Noble by
J. Pollok
their attorney.

(Model.)

20 Sheets—Sheet 11.

C. H. WILLCOX & G. H. NOBLE.
STRAW SEWING MACHINE.

No. 392,087.

Patented Oct. 30, 1888.

(Model.) 20 Sheets—Sheet 12.
C. H. WILLCOX & G. H. NOBLE.
STRAW SEWING MACHINE.

No. 392,087. Patented Oct. 30, 1888.

(Model.)

20 Sheets—Sheet 13.

C. H. WILLCOX & G. H. NOBLE.
STRAW SEWING MACHINE.

No. 392,087.

Patented Oct. 30, 1888.

(Model.) 20 Sheets—Sheet 15.

C. H. WILLCOX & G. H. NOBLE.
STRAW SEWING MACHINE.

No. 392,087. Patented Oct. 30, 1888.

Witnesses.
Wm. Kirkus Jr.
C. J. Hedrick.

Inventors.
Charles H. Willcox &
George H. Noble, by
P. Pollok
their attorney.

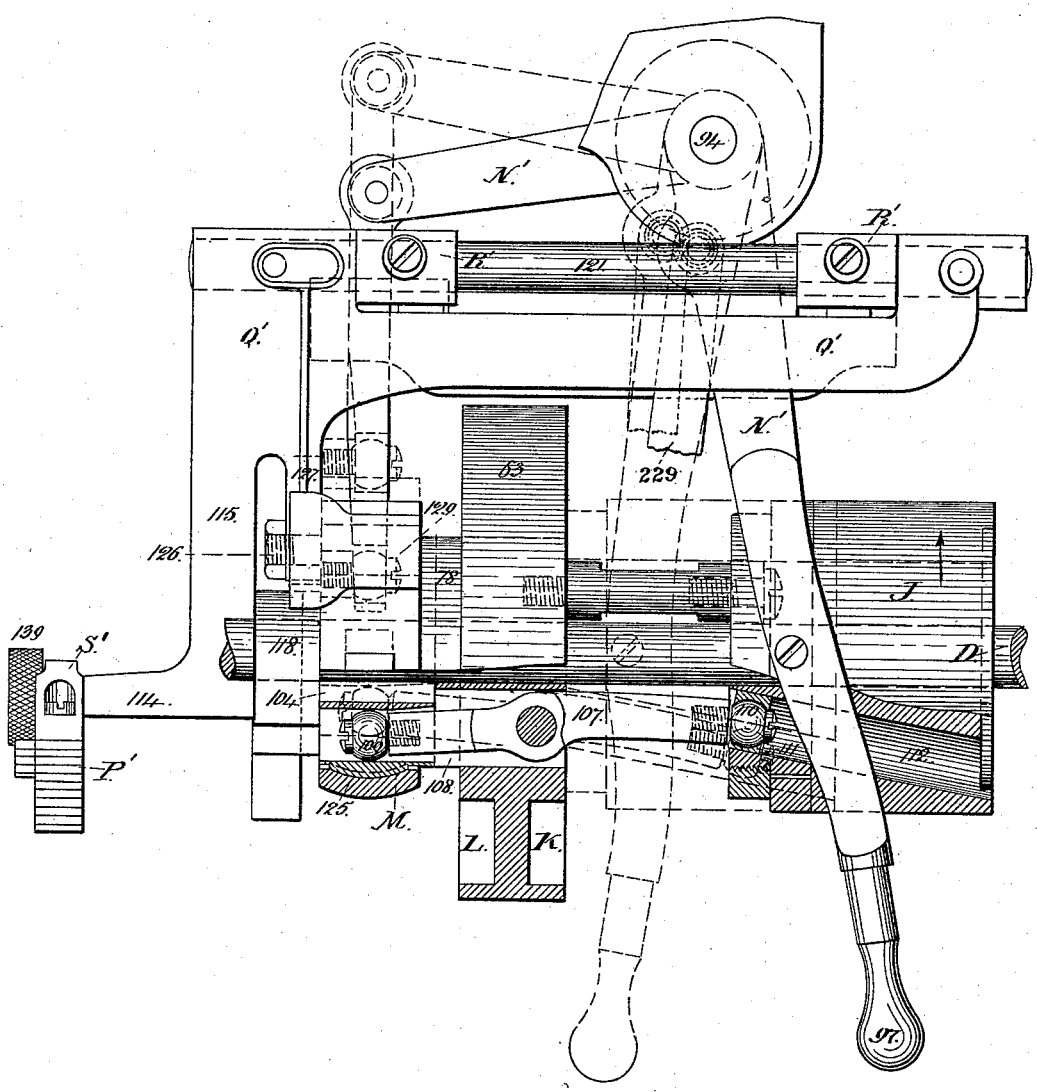

(Model.)

20 Sheets—Sheet 17.

C. H. WILLCOX & G. H. NOBLE.
STRAW SEWING MACHINE.

No. 392,087. Patented Oct. 30, 1888.

Witnesses:
Philip Mauro
C. J. Hedrick

Inventors:
Charles H. Willcox
George H. Noble
by R. A. Pollok
their attorney

N. PETERS, Photo-Lithographer, Washington, D. C.

(Model.) 20 Sheets—Sheet 18.
C. H. WILLCOX & G. H. NOBLE.
STRAW SEWING MACHINE.
No. 392,087. Patented Oct. 30, 1888.
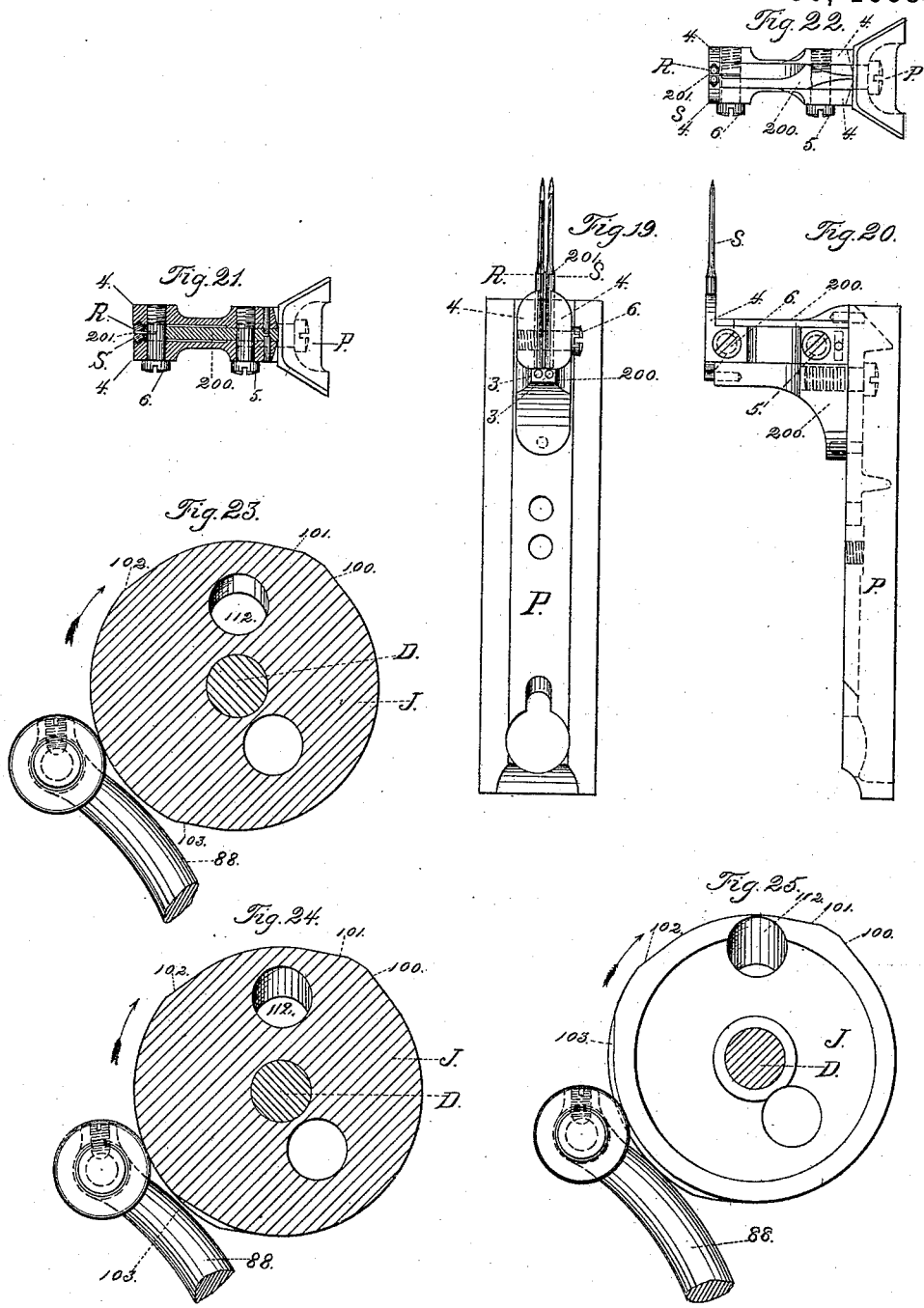

(Model.) 20 Sheets—Sheet 19.
C. H. WILLCOX & G. H. NOBLE.
STRAW SEWING MACHINE.
No. 392,087. Patented Oct. 30, 1888.
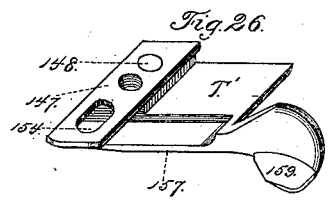
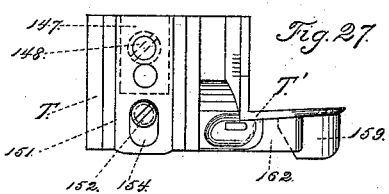
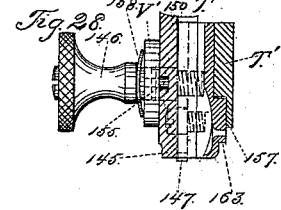
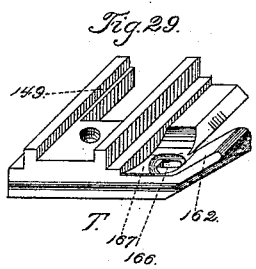
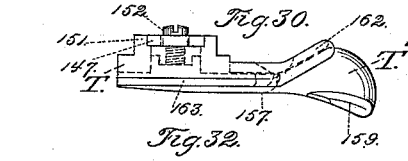
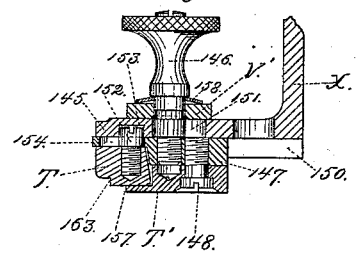
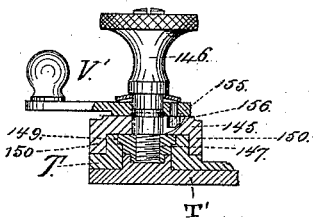
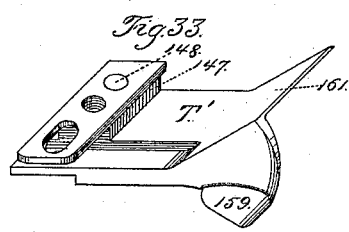
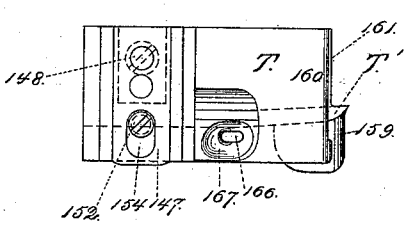
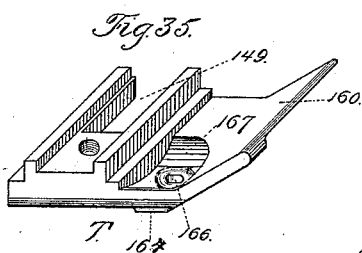
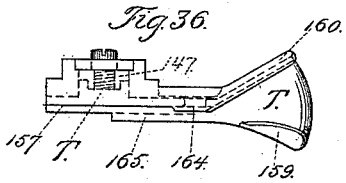
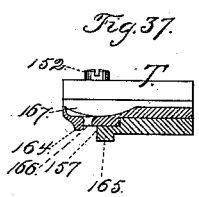
Witnesses.
Philip Mauro
C. J. Hedrick
Inventors.
Charles H. Willcox and
George H. Noble, by
J. Pollok their Attorney.

(Model.) 20 Sheets—Sheet 20.
C. H. WILLCOX & G. H. NOBLE.
STRAW SEWING MACHINE.
No. 392,087. Patented Oct. 30, 1888.
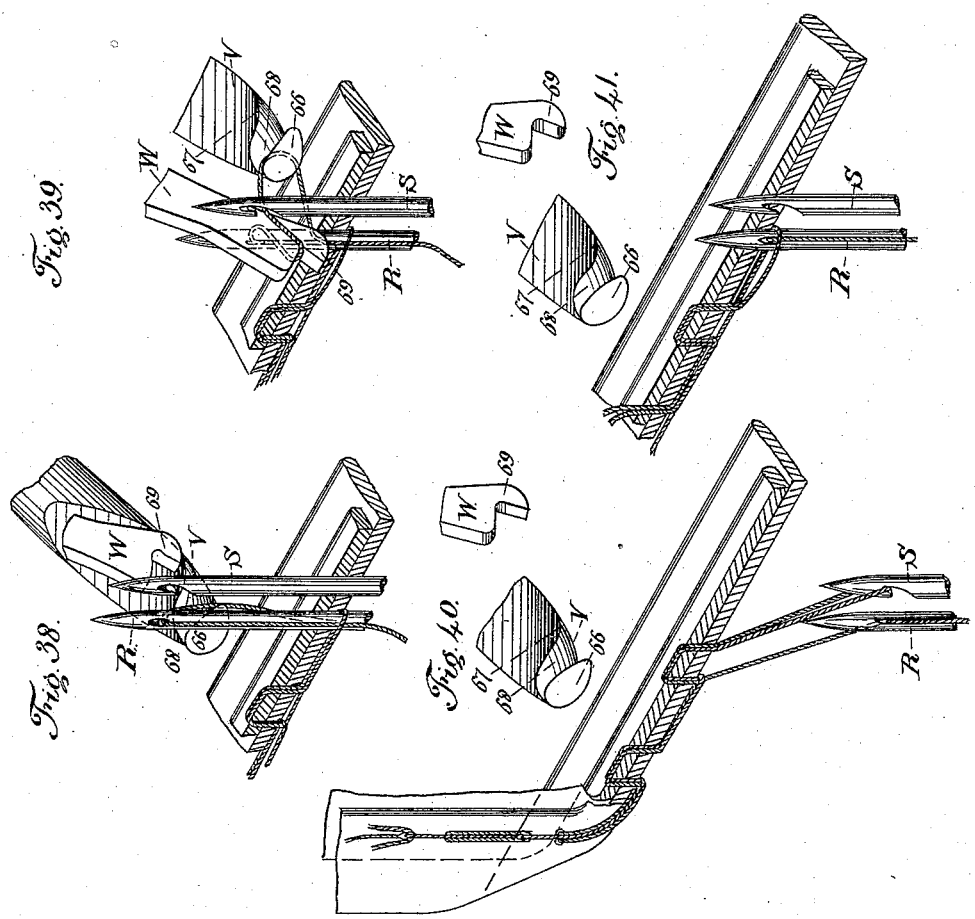

UNITED STATES PATENT OFFICE.

CHARLES H. WILLCOX, OF NEW YORK, N. Y., AND GEORGE H. NOBLE, OF PROVIDENCE, RHODE ISLAND, ASSIGNORS TO THE WILLCOX & GIBBS SEWING MACHINE COMPANY, OF NEW YORK, N. Y.

STRAW-SEWING MACHINE.

SPECIFICATION forming part of Letters Patent No. 392,087, dated October 30, 1888.

Application filed June 8, 1886. Serial No. 204,546. (Model.) Patented in England May 1, 1886, No. 5,926.

*To all whom it may concern:*

Be it known that we, CHARLES H. WILLCOX, of New York city, in the county and State of New York, and GEORGE H. NOBLE, of Providence, in the county of Providence and State of Rhode Island, have invented a new and useful Improvement in Straw-Sewing Machines, which improvement has been patented in Great Britain by Letters Patent No. 5,926, dated May 1, 1886, and which is fully set forth in the following specification.

This invention relates to machines for making a stitch resembling that made in hand sewing—that is to say, a stitch in which the thread on the right side of the work appears in distinct loops separated by spaces instead of extending continuously from each needle-puncture to the next, as in ordinary lock-stitch and chain-stitch sewing.

These machines are specially designed for sewing straw braid into hats, bonnets, and other articles.

The invention has more particular reference to that class of straw-sewing machines in which needles or sewing implements attached to a carrier below the work-plate are thrust upward through the work and co-operate with one or more looping devices supported above the presser-foot.

The invention consists, first, in the combination, with looping devices (one or more in number) which are raised and lowered according to the thickness of the work, of self-adjusting needle-operating mechanism for giving a variable needle-stroke, so that the upper or forward part of the stroke may conform to the position of the looping devices, these devices being made to rise and fall with the presser-foot, in order that they may always be as close as possible to the upper surface of the work. To effect the necessary variation in the needle movement automatically, some adjustable device whose adjustment changes the needle-stroke is connected with the presser-foot by intermediate mechanism, so that the distance of the presser-foot from the work-plate, due to the interposed thickness of work, determines the position of the adjustable device. This intermediate mechanism will for convenience be hereinafter termed the "controller mechanism." It may of course be made in a variety of forms, the essential point being that it constitutes a connection between the proper needle-working mechanism or some adjustable part thereof and the presser-foot or some equivalent part of the machine, so as automatically to control or regulate the stroke given to said mechanism. It is believed to be entirely new to have the stroke of the needles (whether one or more) conform automatically to the variable position of co-operating looping devices, (whether one or more.)

The controller mechanism considered best adapted to the purpose will be explained hereinafter. In it are also embodied certain other improvements, among which may be mentioned the following: (a) the adjustable device making part of the needle-operating mechanism is made adjustable on a lever or lever-arm, so as to vary its length, and is held in place by friction or pressure, so that the stroke can be increased or decreased gradually; (b) to prevent accidental shifting of the controller mechanism an automatic clamp is provided, which clamp is relieved at a certain time, so as to allow the controller mechanism then to be readily shifted; (c) a loose joint (such as a pin in a slot or two contact devices which impart positive motion one to the other in one direction only) admitting of a certain amount of lost motion is provided in the controller mechanism, so as to allow the presser-foot to rise and fall with the feed without changing the needle-stroke, or to allow the presser-foot when the controller mechanism is clamped and an increased thickness of work passes under the presser-foot to rise without having to overcome the power of the clamp, or to allow both operations to take place; (d) preferably a spring is combined with the controller mechanism for keeping the parts of this loose joint together, except when its force is resisted by the controller-clamp. If, therefore, an increased thickness of work comes under the presser-foot while the clamp is on, the presser-foot rises and the parts of the joint separate; but as soon as the clamp is released the spring brings the parts together again and shifts the controller mechanism to the desired extent. This release is or may be always effected before the needles again rise to the top of their stroke, and preferably before they enter the work. By releasing the clamp only when the feed surface is about to go out of action it is evident that only a slight change takes place in the controller mechanism in consequence of the feed motion, and at high speeds the amount is reduced by the fact that a little time is required for the spring to overcome the friction and inertia of the parts. To secure the best results the spring should be interposed between the presser-foot and the adjustable part of the needle operating mechanism, so that its force is mainly exerted in drawing the parts of the loose joint together, and is or may be varied but little with a higher or lower position of the presser-foot.

The invention also consists in automatic mechanism (such as a cam and connections) for giving an extra pressure to the presser-spring while the needles are thrust through the work, and restoring the normal pressure during the action of the feed. Heretofore such an extra pressure has been given by the compression of a spring separate from the presser-spring; but this entails a double adjustment in order to vary both the heavy or extra pressure and the normal pressure, and it also involves the use of duplicate springs and other devices.

The invention further consists in an independent take-up and its operating cam in combination with the tension and the special stitch-forming mechanism composed of an eye-pointed needle, a hook-needle, and one or more looping devices. The take-up is arranged to act upon the thread between the tension and the eye pointed needle. The looping devices consist, preferably, of a looper and threader, and they operate to take the loop from the eye-pointed needle and insert it under the barb of the hook-needle. The "independent" take-up is so called in contradistinction to a take-up which is formed by the needle-carrier or is operated synchronously therewith. The independent take-up is operated by a cam and can be given such movements as are found most desirable for tightening the stitch or for other purposes. Practically as the peculiar stitch made by the eye-pointed and hook needles and the co-operating looping devices is rather difficult to tighten properly, the independent take-up is an important improvement over the needle-carrier take up heretofore employed in the combination.

The best form of take-up, or what is considered the best, will be shown, and in it are embodied several minor improvements, consisting, principally, in the special shape of certain parts of the take-up cam. For example, it is found desirable for the take-up to draw upon the thread during the ascent of the needles until the eye-pointed needle begins to push the loop through the work, and then to give up the thread during the remainder of the rise. The take-up cam is shaped to give the take-up suitable movements at the proper time. It is further found desirable for the take-up to give up the thread not so fast as it is required by the eye-pointed needle, in order that the needle may be compelled to draw in the thread which is rove around the material to form the preceding stitch, and thus further to tighten it unless this has already been drawn in as tight as desirable, and in that case to draw thread through the tension. This effect of making the eye-pointed needle tighten the preceding stitch as it is pushing the loop through the work is quite important with straw goods on account of the extensible nature of the latter, because in making the preceding stitch the feed has stretched the goods, and it is now released from the feed-surface and can be contracted by the tightening of the stitch. In order to insure the throwing of a proper loop to be taken by the looper the thread is slackened by the take-up before the loop is thrown—that is, when the needles reach the top of their stroke.

The invention also consists in a variably intermittent tension—that is to say, a tension which is not only intermittent in its action, being opened and closed at proper times by a moving part of the sewing-machine, but in which also an adjustment is provided whereby it may be held open longer, or not so long, at the same stage in the operation of the machine, according to said adjustment.

Heretofore it has been customary to provide some forms of intermittent or automatic tension apparatus with an adjustable device, in order that the tension may be set to open and close at the proper times; but when once set it is not varied in order to accomplish any effect in the operation, but remains unaltered for all fabrics and all lengths of stitch, and means are commonly provided to prevent a ready alteration.

In the present invention the variation is designed to allow more or less thread to be drawn through according to the length of stitch. It is therefore most advantageous to connect the adjustable part of the tension with the adjustable part of the feed mechanism, so that the adjustment of one effects simultaneously and to the proper extent the adjustment of the other without further care on the part of the operator. Moreover, the opening and closing of the tension are so timed relatively to the take-up that the latter is rendered in effect a variable take-up. The adjustable part of the tension may be, and preferably is, a cam movable to change the surface which acts upon the roller to open and close the tension.

It is further found desirable to increase or diminish the degree of tension with the length of stitch. Devices for making such changes therefore are or may be combined with the mechanism for changing the times at which the tension is applied and released.

It is not new to combine with a tension apparatus and feed-regulating mechanism devices for varying the degree of tension in accordance with the length of stitch; but the novelty of this improvement consists in having both the degree of the tension and the times for applying and releasing the same variable together.

The invention also consists in a special feed mechanism in which the feed-bar is attached to a feed-rocker at the rear end and is operated by two eccentrics—one an invariable eccentric to raise and lower the feed-surface and the other an adjustable eccentric to impart the back and forth movements thereto. The adjustable feed-eccentric is connected with the adjustable tension-cam.

A further improvement in the feed mechanism is an arrangement of mechanical connections such that the feed-surface rises at the same place whatever the length of stitch, the variations in the feed movement taking place at the end and not at the beginning of the advance. This is not, of course, a new effect in feed mechanism; but it is believed to be now first accomplished in a feed mechanism wherein an eccentric adjustable transversely to its shaft, so as to increase and diminish its eccentricity, is employed to produce the back and forth movements.

The invention also consists in a feed mechanism comprising as part of the regular feeding and feed controlling devices, or in addition thereto, means whereby in the running of the machine a force is generated which tends to lengthen the stitch, and retaining devices so adjusted or having such resistance as to withstand the said force at a low speed, but to be overcome thereby at a higher speed and thus permit the stitch automatically to be lengthened in passing from a low to a high speed. This increase is desirable in sewing straw braid into hats, because in sewing around the small circles at the center of the crown or tip, at which it is customary to begin, it is necessary to use short stitches, and as the circles increase in diameter longer stitches may be used with advantage. To have it effected automatically is desirable, because, at this time especially, the attention of the operator is, or should be, concentrated on the work and both hands are employed in holding the work. As the running of the machine is naturally slow in starting the tip, and is increased as the diameter of the circles increase, the utilization of force generated by the speed of running can advantageously be employed. In the machine considered the best embodiment of this and the other improvements the operative force is an effect of the inertia of the feed-bar and other reciprocatory parts; but the invention is not limited to this precise mode of producing it.

To prevent the resistance of the work in feeding from shifting the feed-controlling devices and thus shortening the stitch, a pawl is provided which when in engagement prevents motion of said devices in that direction, but permits them to move so as to lengthen the stitch. To prevent the stitch being increased beyond a predetermined length a stop is provided, which can be set to arrest the automatic movement. Provision is also made for permitting the operator to lengthen or shorten the stitch by hand.

The invention further consists in a construction of feed-bar, needle-carrier, and work-plate to facilitate the handling of the work. The work-plate of small dimensions projects beyond the main part of the machine-frame and the needle-carrier and feed-bar, which, as well as their operating mechanisms, are arranged below the work-plate, are provided with brackets or lateral projections for carrying the needles and feed-surface, respectively. The bodies of the needle-carrier and feed-bar, as well as that of the machine-frame, are thus off to one side, and the work can easily be passed around under the brackets or lateral projections. The feed-bar and needle carrier, with the operating mechanism, being below the work-plate, only the presser-foot and necessary guides are above the same. The presser-foot is attached to the end of a horizontal arm, so that the work can be bent over it if occasion requires. By these dispositions the work can very readily be turned into the various positions required in shaping different articles or different parts of the same article.

The invention also consists in an arrangement of the looper and threader on the inside of the needles so that the thread can be passed through the eye of the eye-pointed needle from the outside, and when the needle is below the work-plate, the looper and threader and their operating mechanism being suitably modified to adapt them to their new position. The threader moves outward between the needles in order to lay the thread around the blade of the hook-needle below the barb.

The invention also consists in a new or improved system of adjustable guides adapted to co-operate with the stitch forming mechanism by directing the straw braid properly thereto.

The invention lastly comprises certain new constructions, combinations, and arrangements of parts, as hereinafter set forth.

The following is a description of what is considered the best mode of applying the principle of the invention, reference being had to the accompanying drawings, which form a part of this specification.

For greater certainty of description it may be stated that in this specification the front of the machine is where the operator sits, the right or right-hand end of the machine is toward or on the operator's right hand, and the left on the operator's left. The driving-wheel is placed at the right and the stitch-forming mechanism at the left end of the machine.

Figure 2:
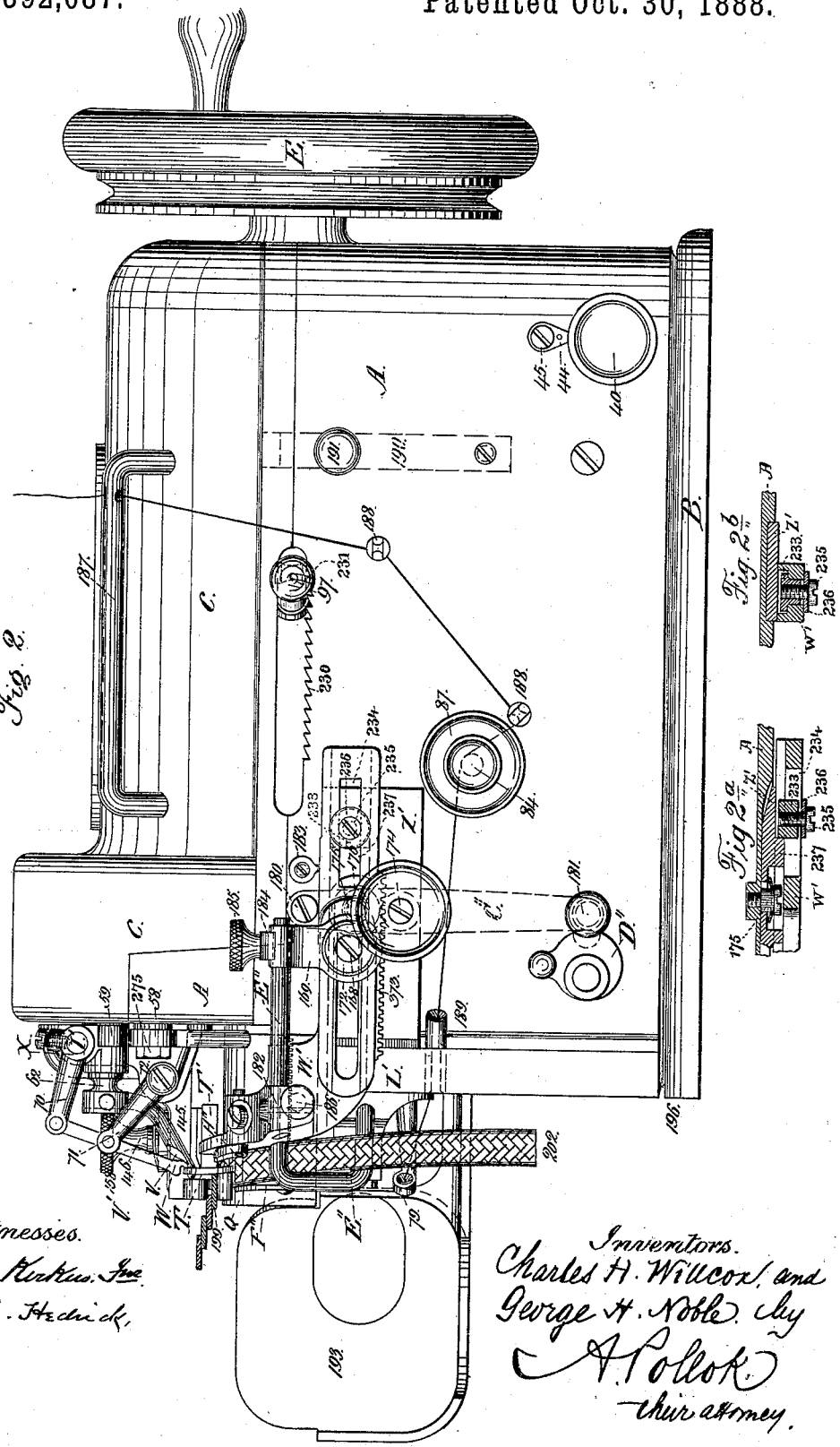
Figure 3:
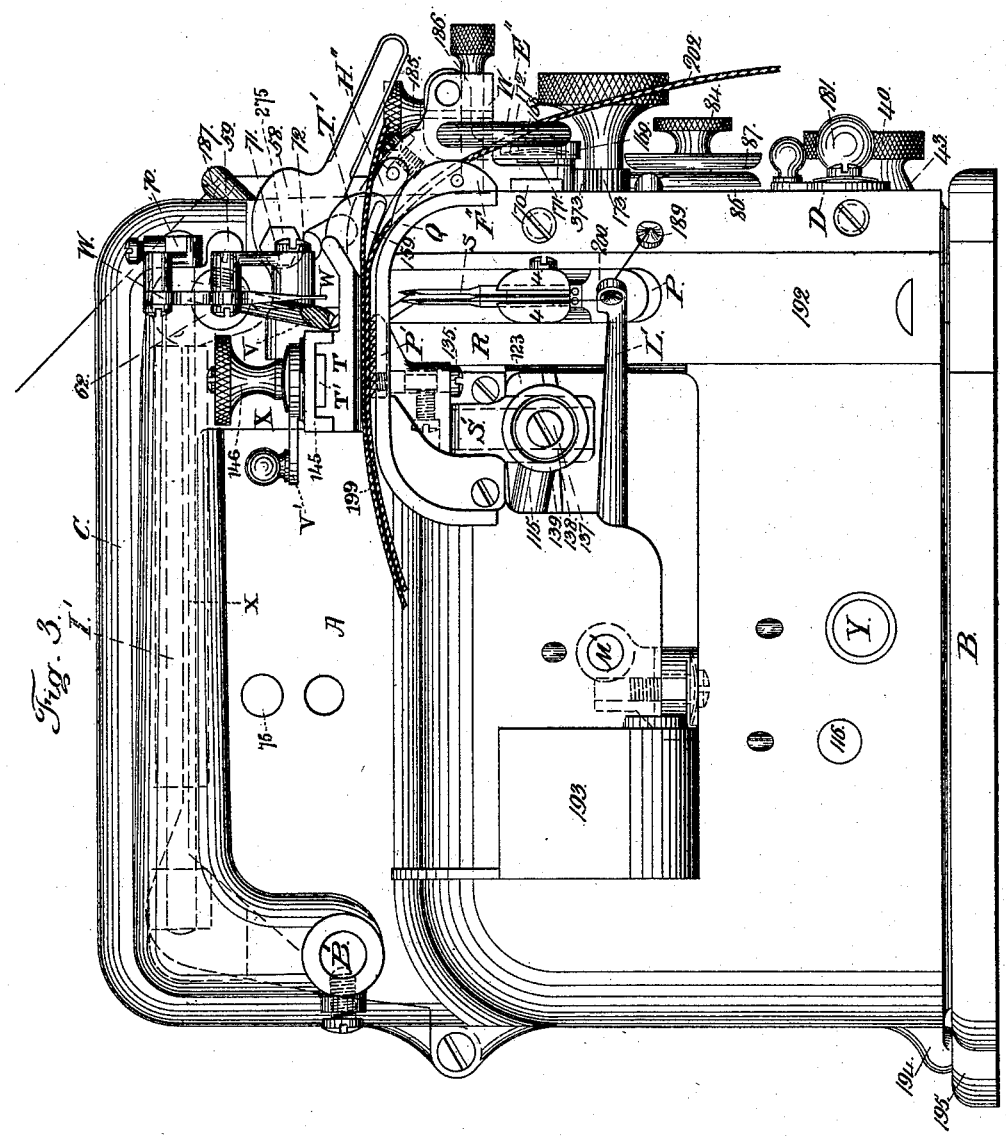
Figure 4:
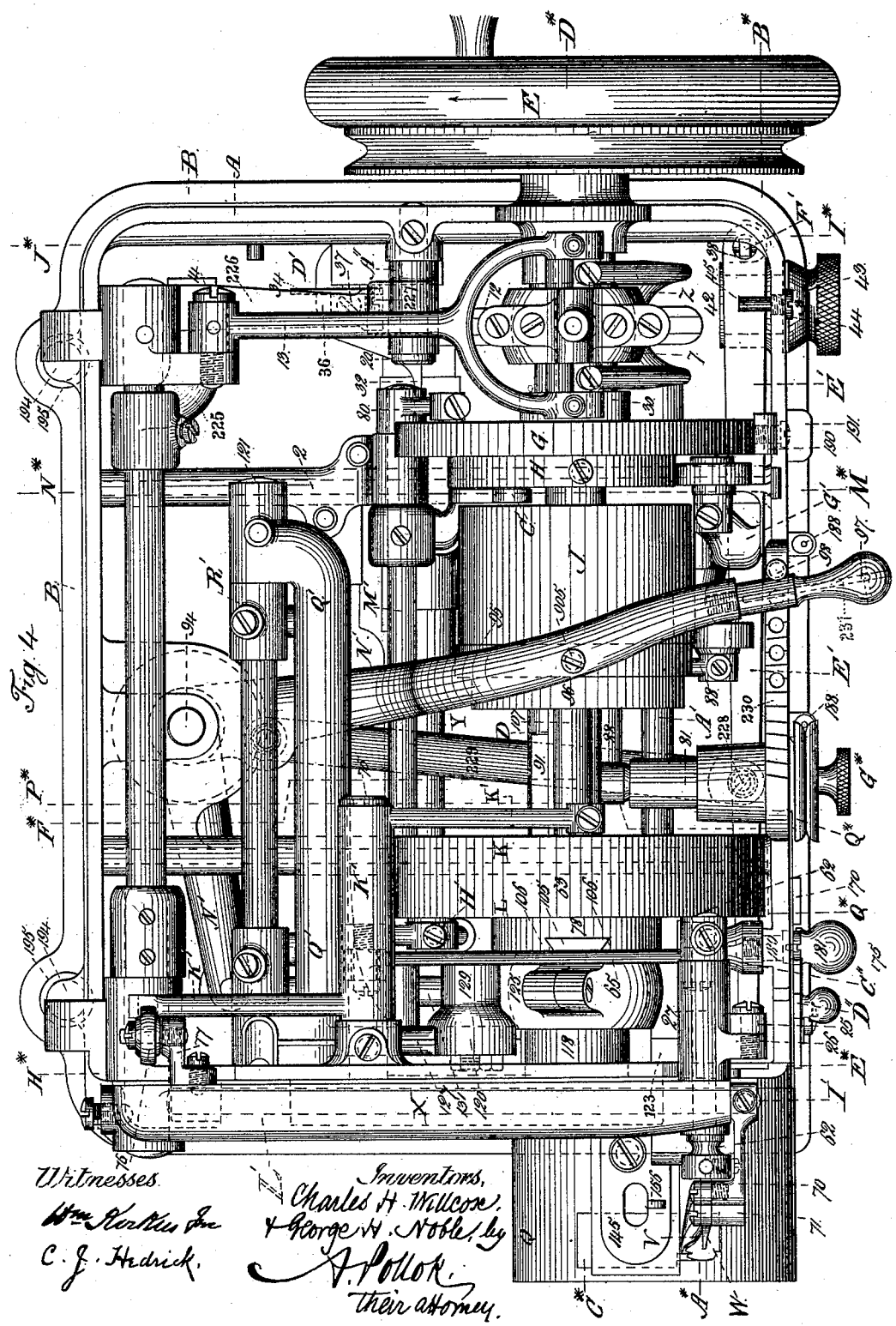
Figure 5:
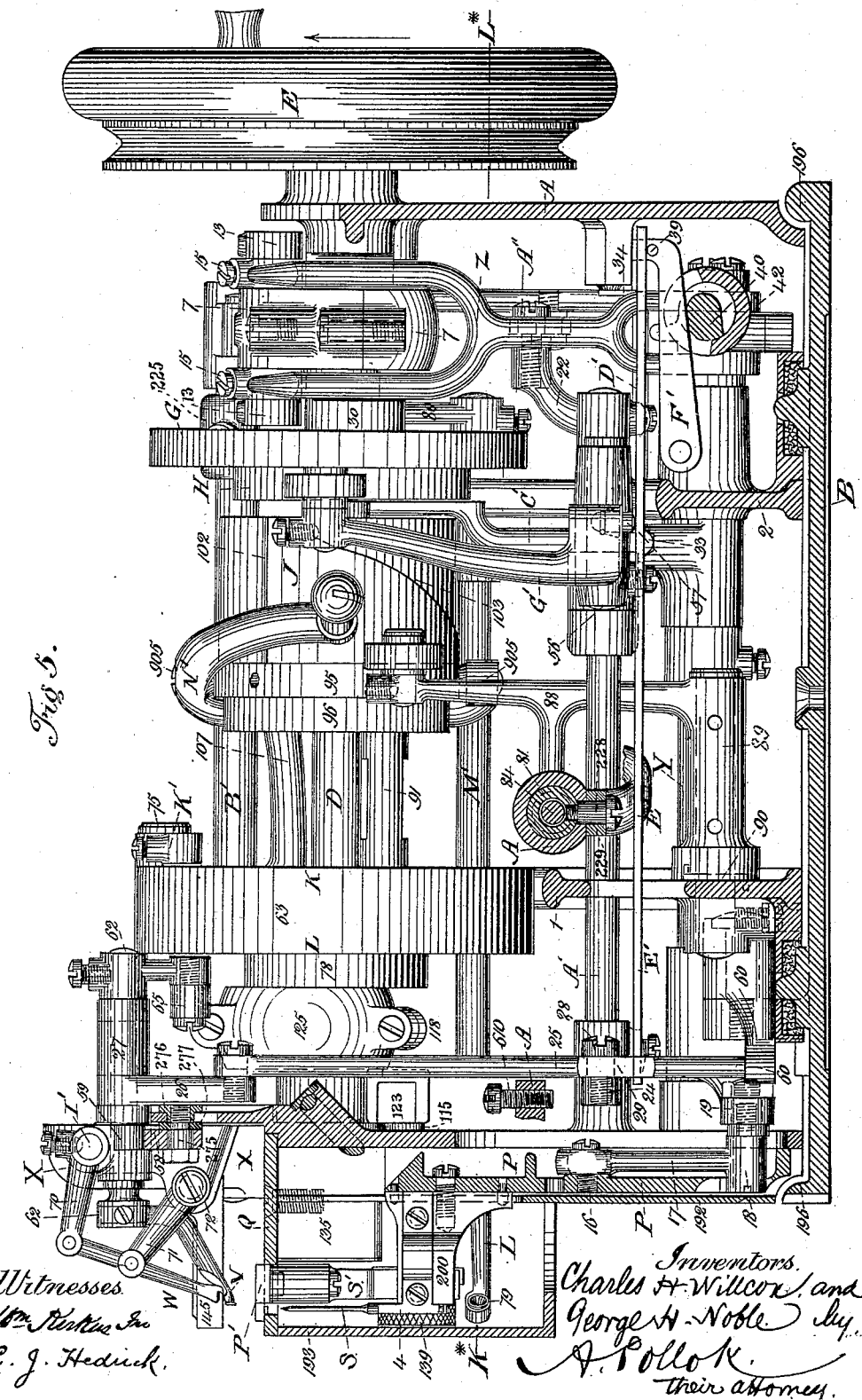
Figure 6:
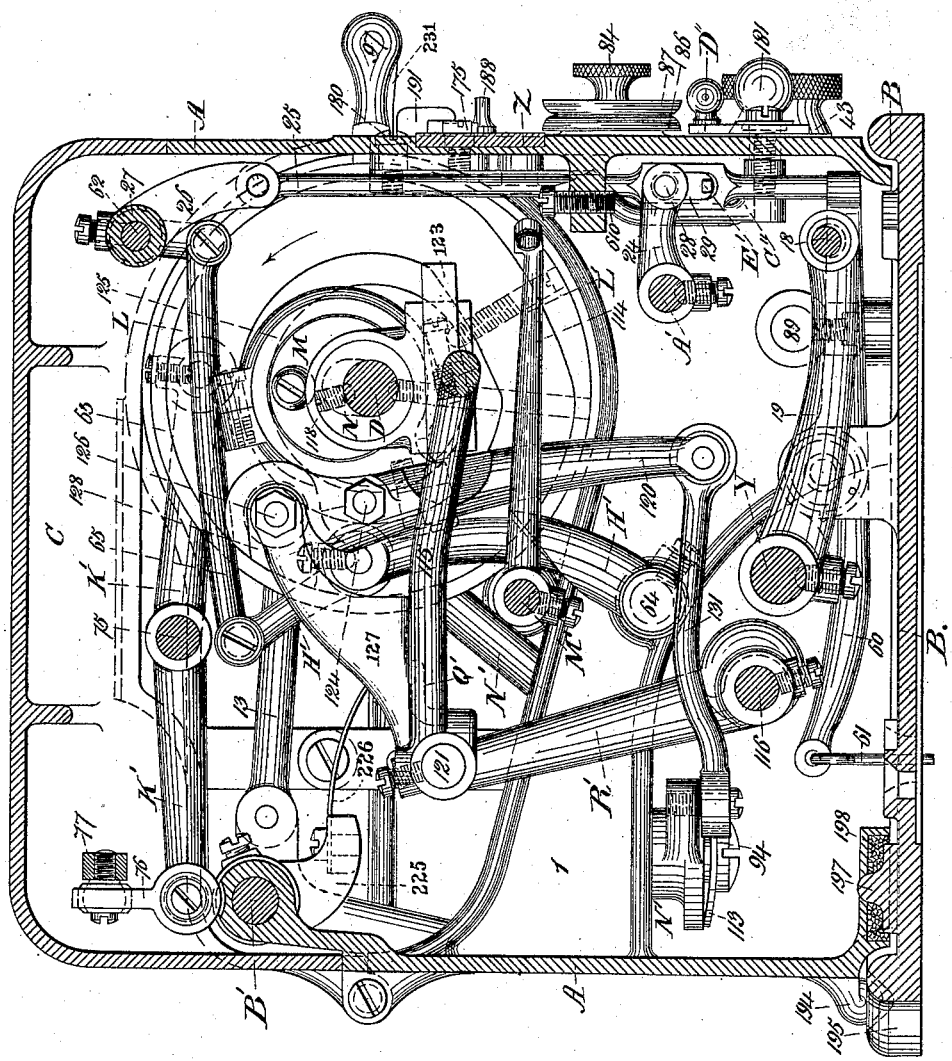
Figure 7:
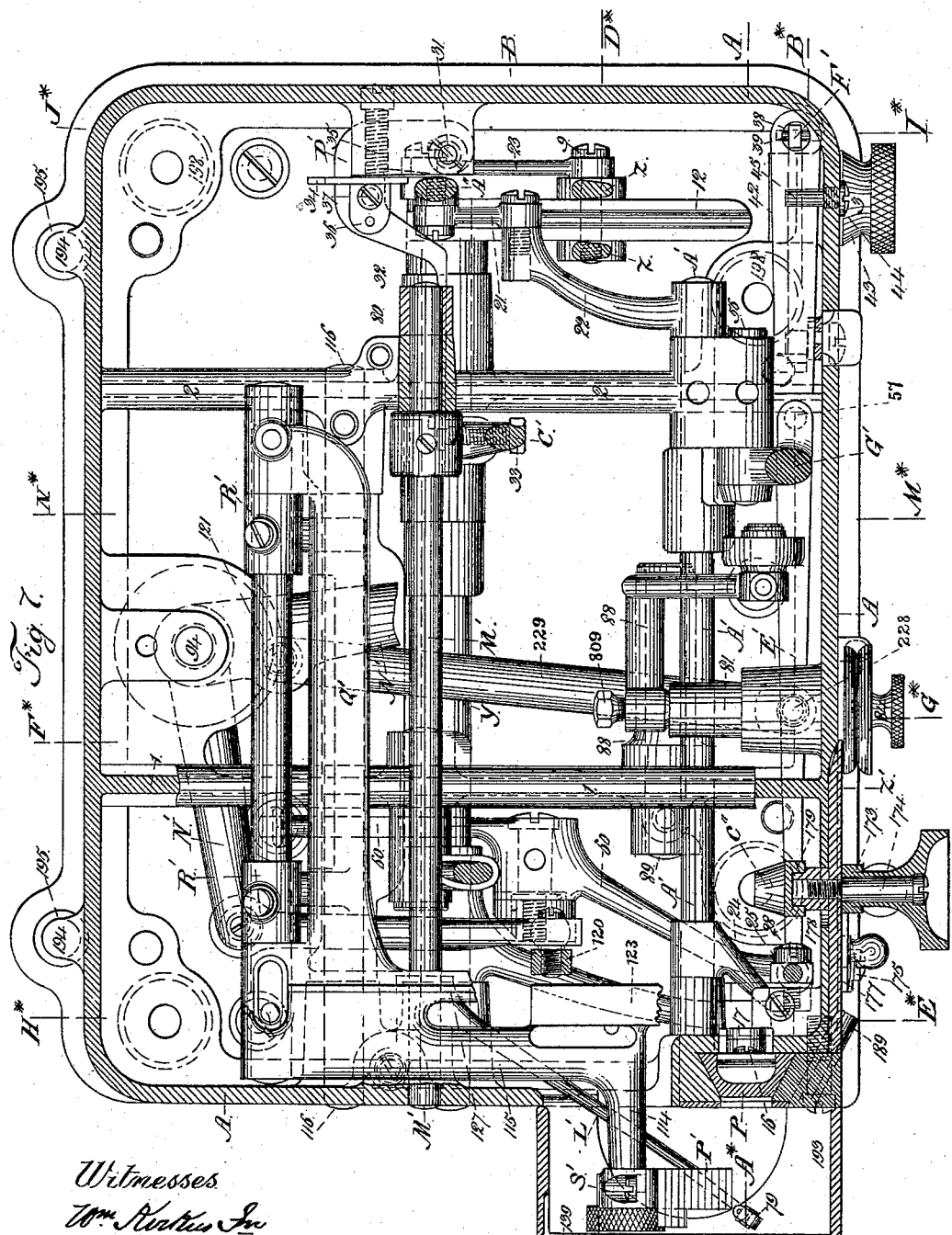
Figure 8:
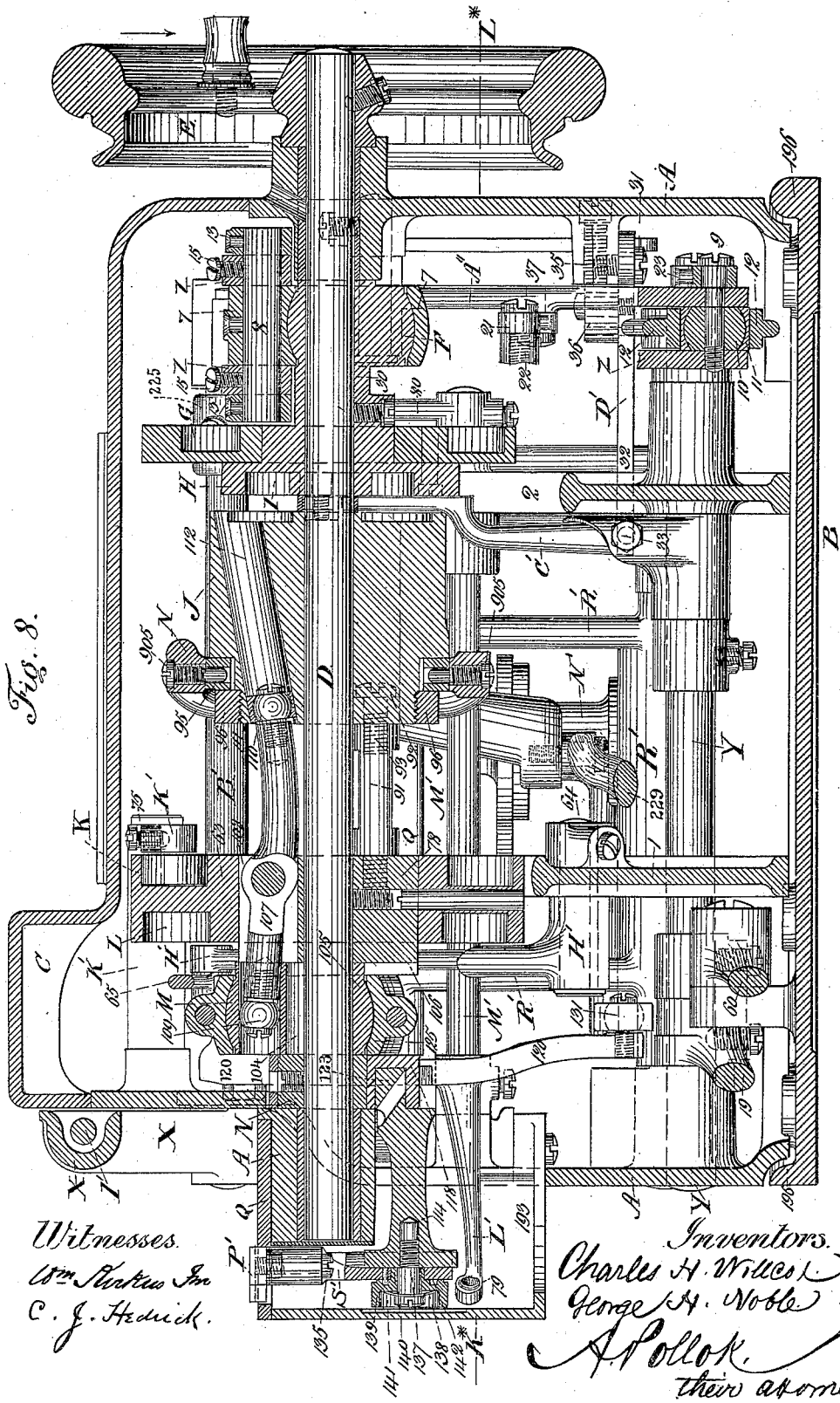
Figure 9:
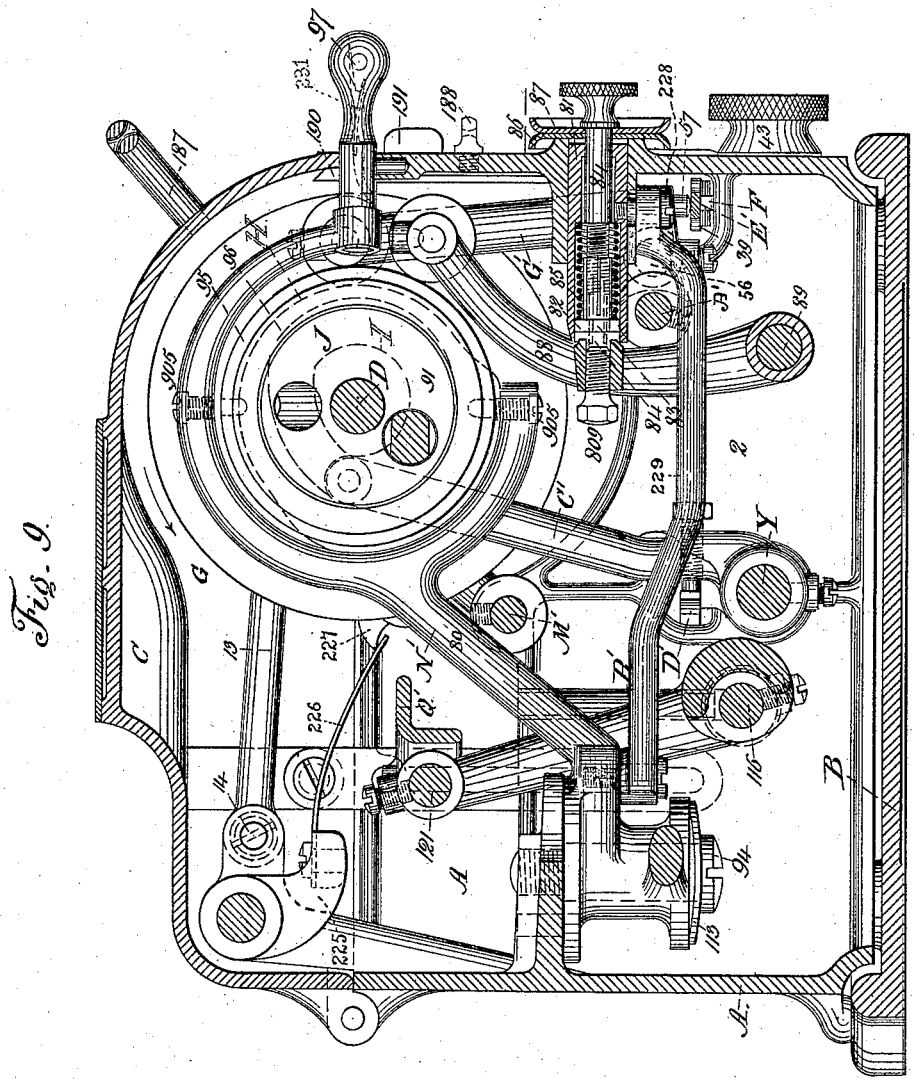
Figure 10:
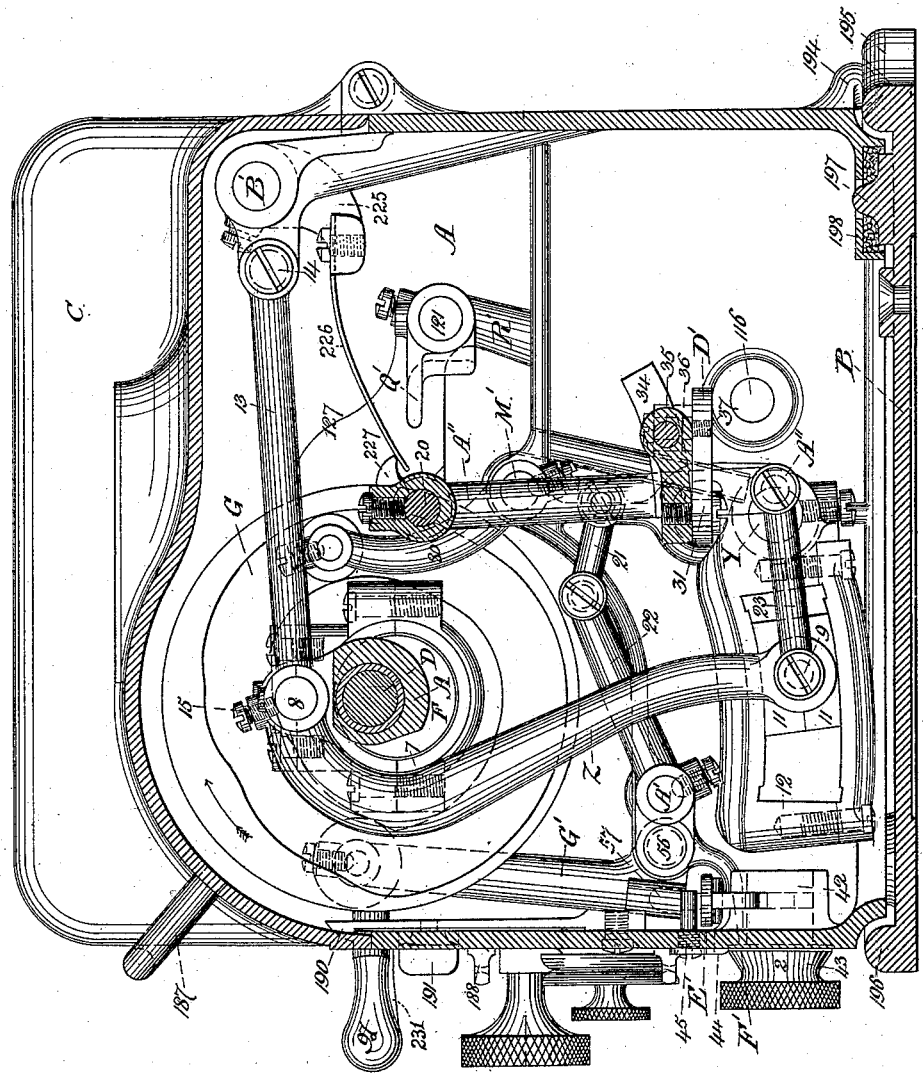
Figure 11:
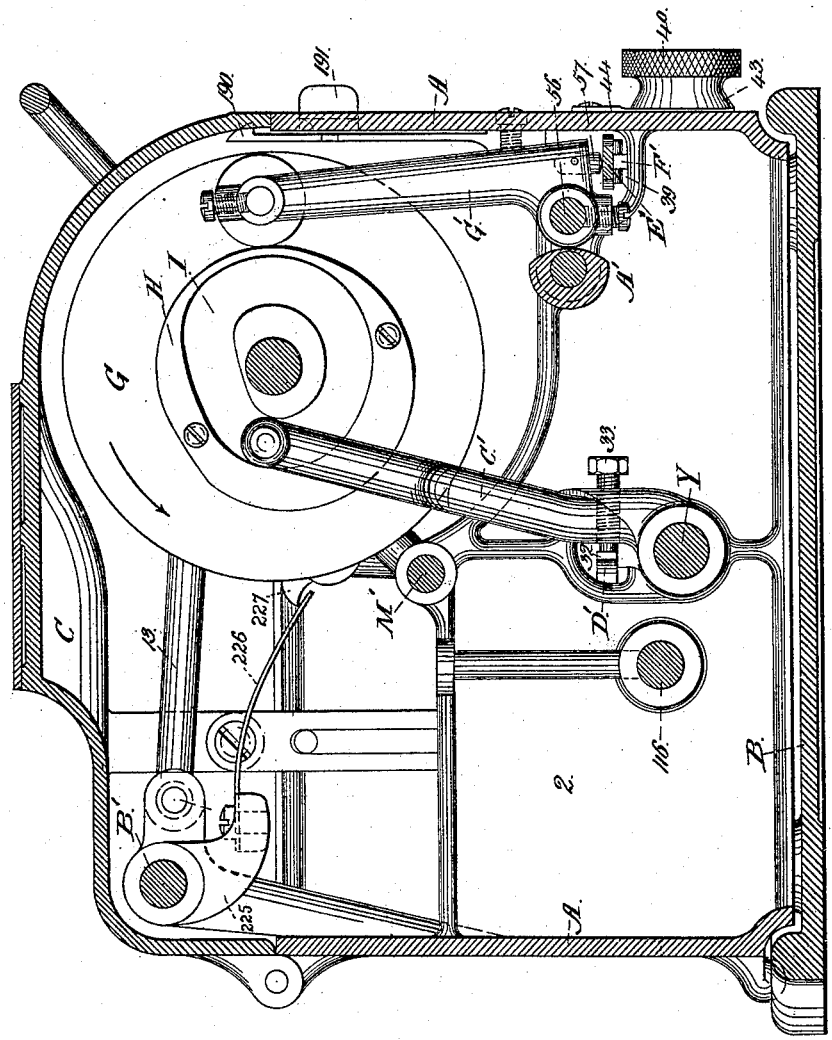
Figure 12:
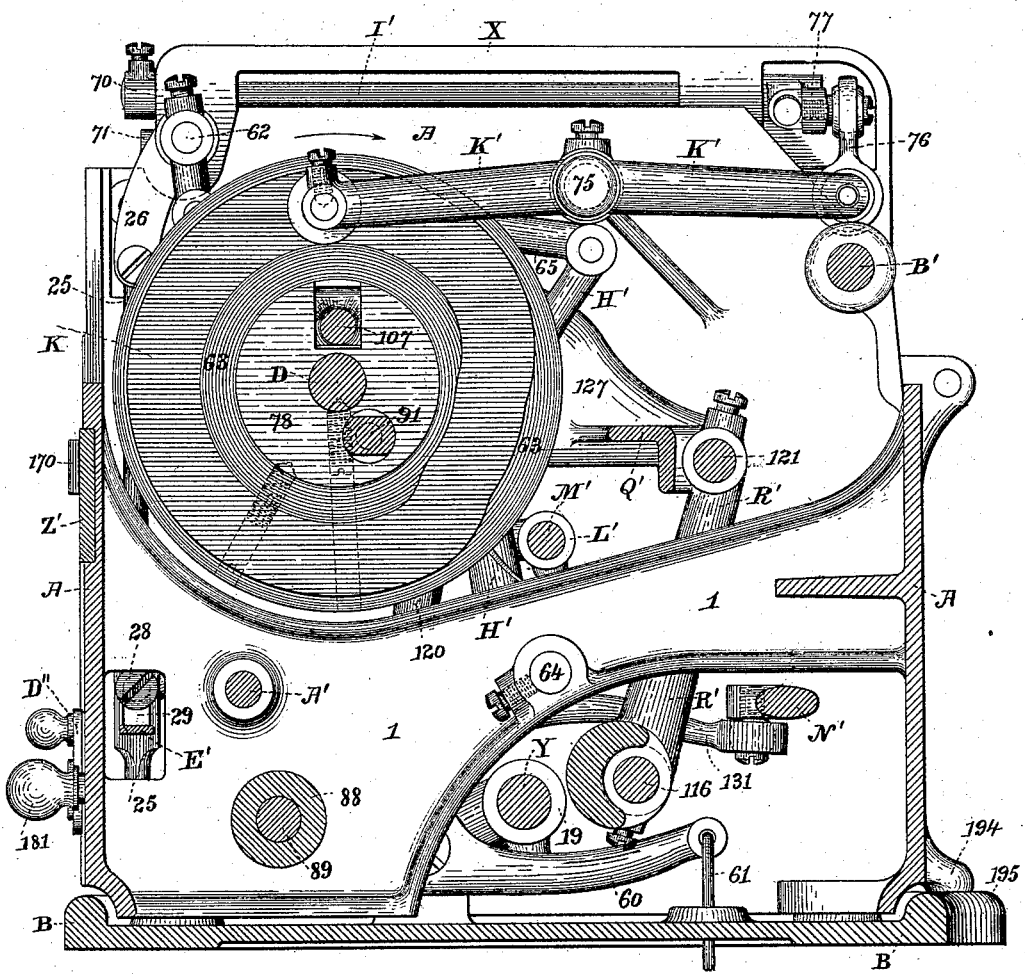
Figure 13:
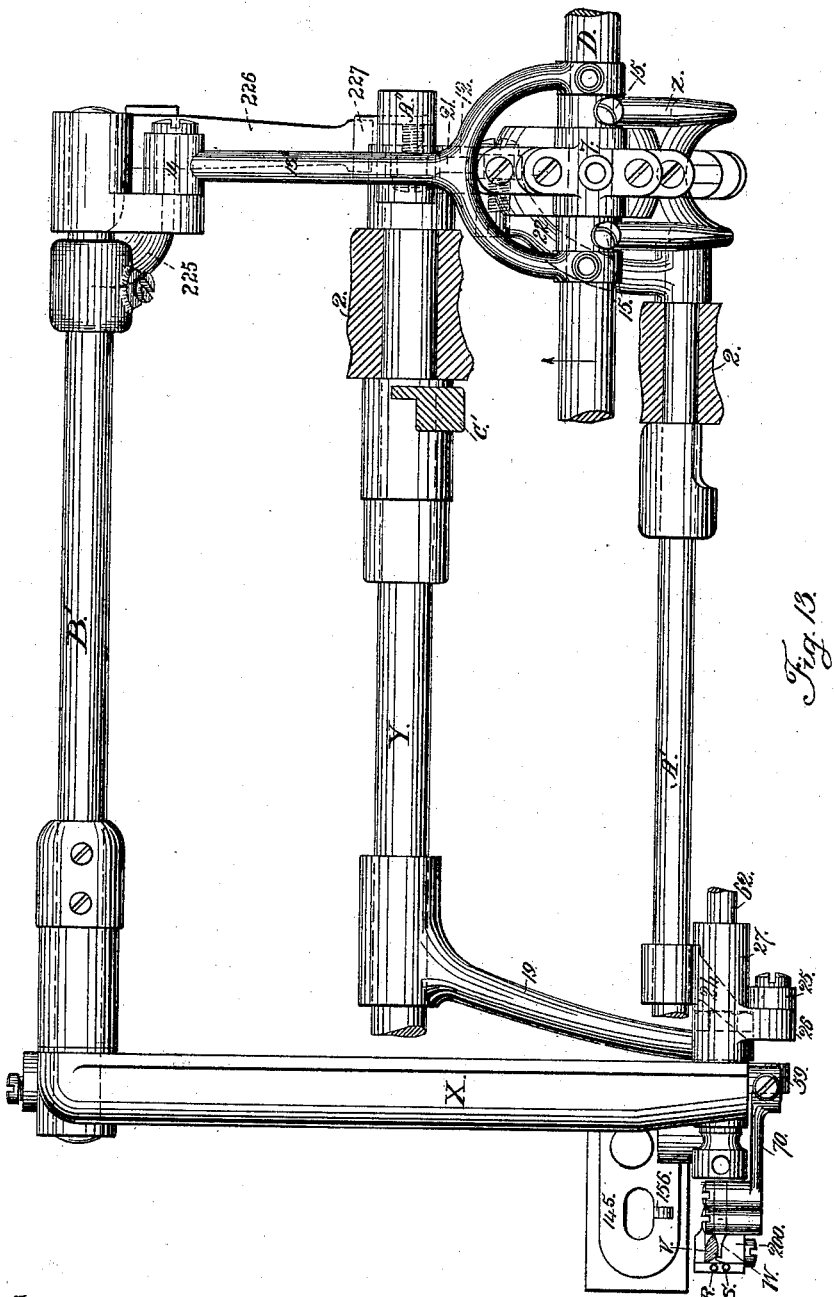
Figure 14:
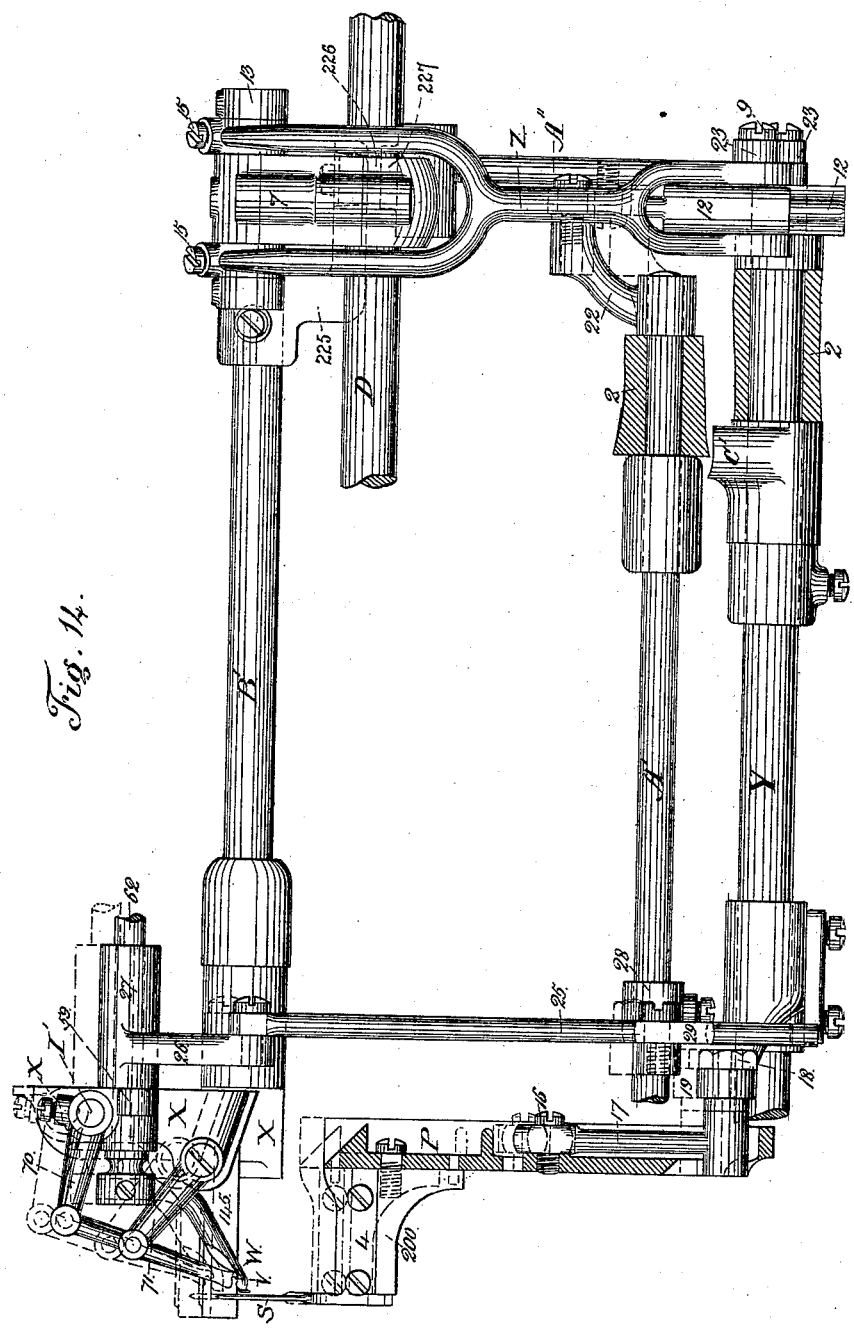
Figure 15:
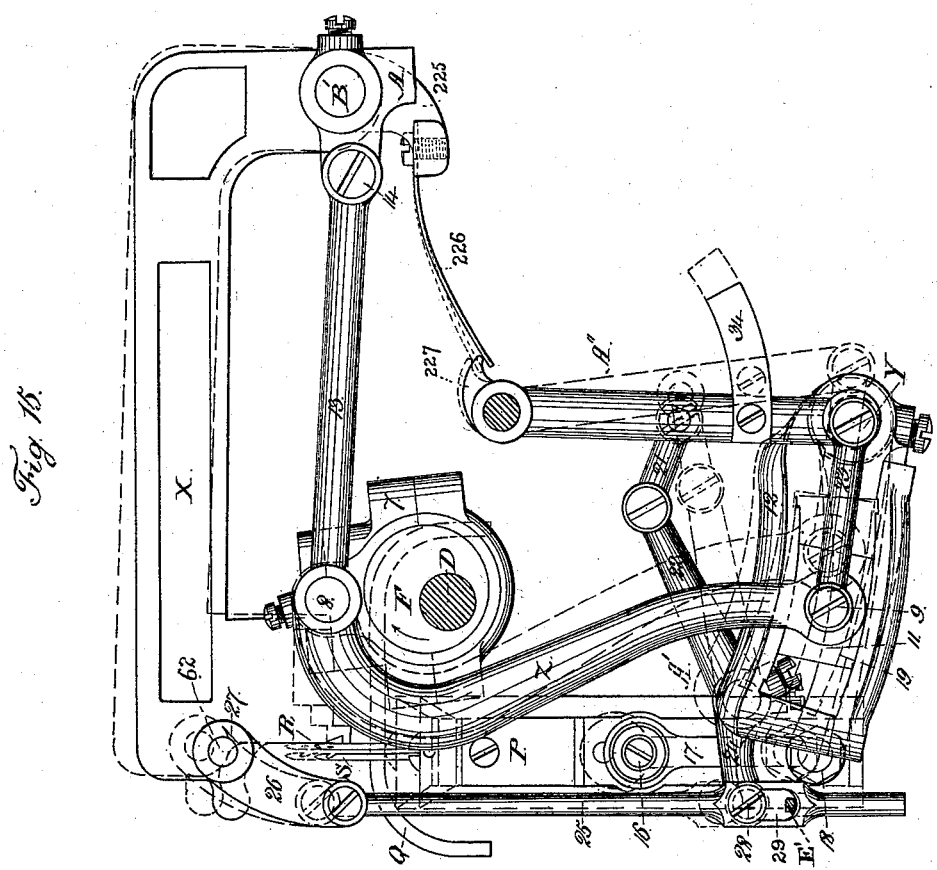
Figure 18:
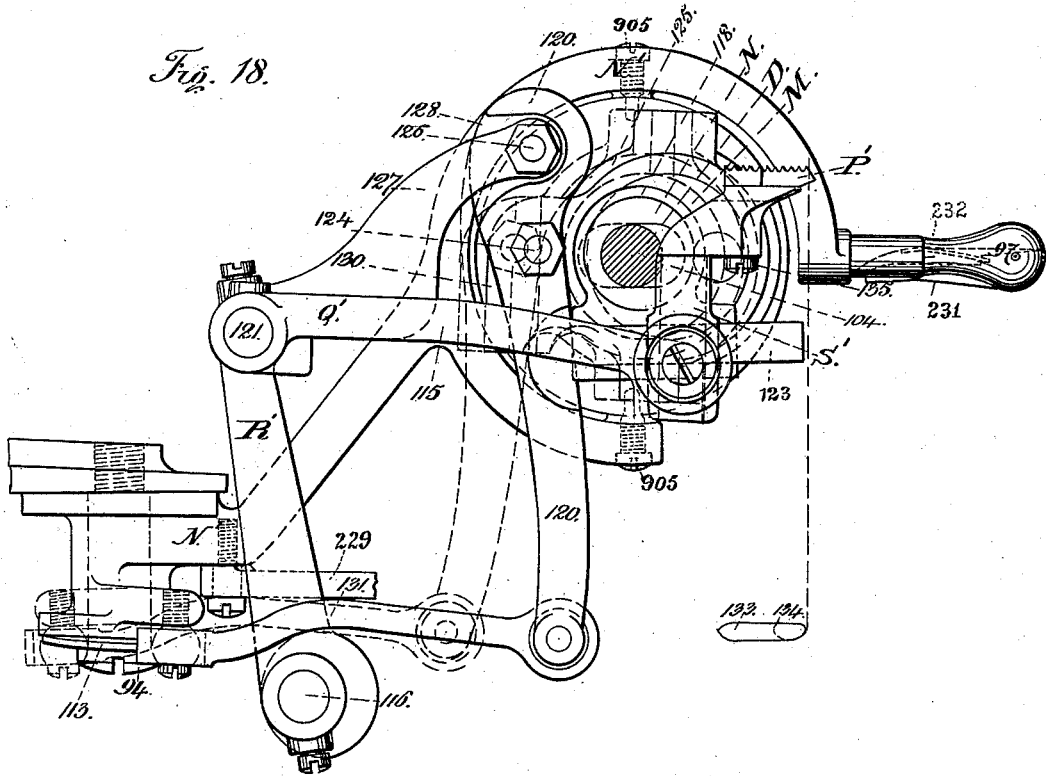
Figure 17:
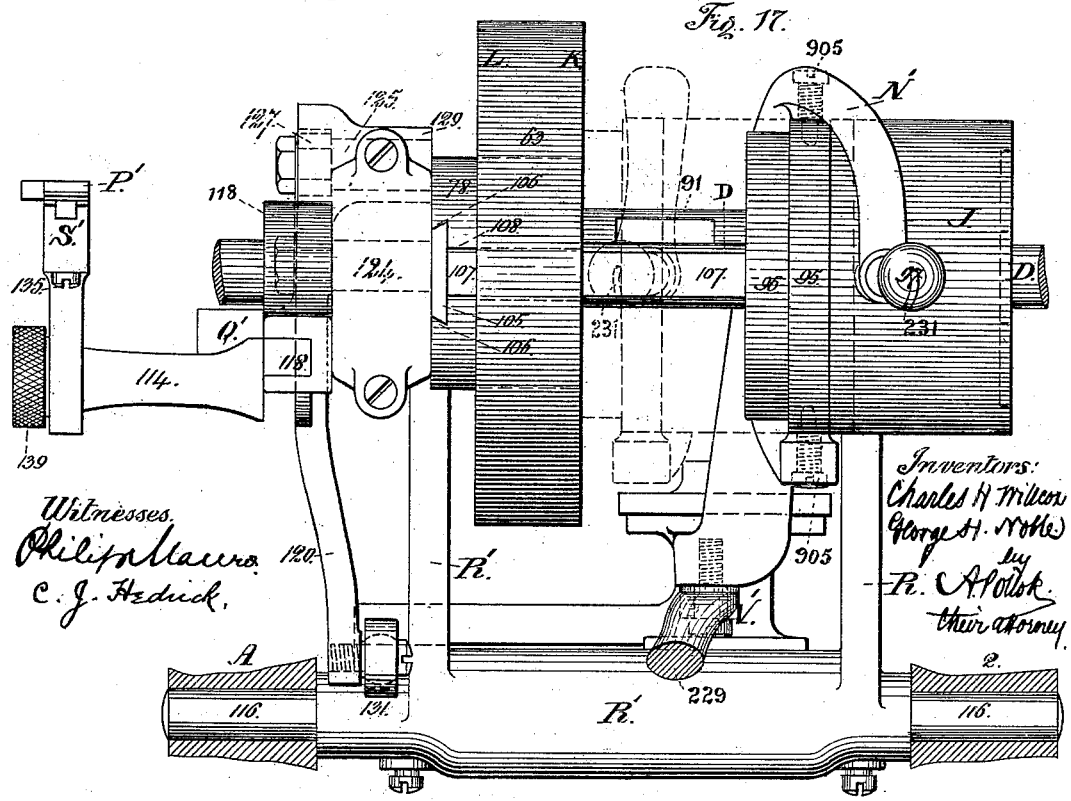

Figures 1, 2, and 3 are respectively a plan, a front elevation, and a left-end elevation of a machine constructed in accordance with the invention; Figs. 2$^a$ and 2$^b$, detail views of the adjustable stop for the braid-guide; Fig. 4, a plan view of the machine with the cover removed; Fig. 5, a vertical longitudinal section on line A* B*, Fig. 4, in elevation, looking to the rear; Fig. 6, a vertical cross-section on line E* H*, Fig. 4, in elevation, looking to the right; Fig. 7, a horizontal section or sectional plan on line K* L*, Fig. 5; Fig. 8, a vertical longitudinal section on line C* D*, Fig. 4, in elevation, looking to the rear; Figs. 9 and 11, cross-sections on lines G* F* and M* N*, Fig. 4, respectively, in elevation, looking to the right; Fig. 10, a cross section on line I* J*, Fig. 4, in elevation, looking to the left; Fig. 12, a vertical cross-section on line P* Q*, Fig. 4, in elevation, looking to the left; Figs. 13, 14, and 15, detail views of the needle-operating mechanism in plan, in front elevation, and in right-end elevation, respectively, also partly in section; Figs. 16, 17, and 18, detail views in plan, in front elevation, and in left-end elevation, respectively, (also partly in section,) of the feed mechanism; Figs. 19, 20, 21, and 22, detail views of the needle-carrier; Figs. 23, 24, and 25, views illustrating the operation of the tension-cam; Figs. 26 to 37, detail views of the work-guides, and Figs. 38, 39, 40, and 41 enlarged views illustrating the formation of the stitch.

The moving devices are supported in the frame A in the general form of a hollow rectangle with cross-webs 1 and 2. This frame rests on the base B, and is provided with a hinged cover, C. The main shaft D is journaled in bearings in the ends of the frame A, and carries (beginning with the right-hand end of the shaft) the fly-wheel and pulley E, the needle-eccentric F, the take-up cam G, the extra pressure cam H, the controller-clamping cam I, the tension-cam and feed-regulating slide J, the threader-cam K, the looper-cam L, the variable feed-eccentric M, and the feed-lifting eccentric N. From these eccentrics and cams all the automatic movements are imparted.

The feed-regulating slide and tension-cam J, as well as certain other parts hereinafter described, are adjustable or movable by hand or at the will of the operator.

The needle-carrier P is supported in ways at the left end of the frame A below the curved and projecting work-plate Q, and carries (by means of a bracket, 200, bolted to the carrier at its upper end) an eye-pointed needle, R, and a hook-needle, S. They may be secured by any ordinary or suitable means, the hook-needle directly in front of and with the hook turned toward the eye-pointed needle. The long groove in the eye-pointed needle is placed on the left or outside thereof.

As shown, the shanks of the needles are flattened or cut away on one side, (see Figs. 19 to 22,) and are placed at one end of the bracket 200, on either side of a mid-feather, 201, with the flat side against the same. This flat surface not only prevents the needle from turning on its axis, but also allows the two needles to be brought closer together. Coarse needles have the shank less cut away than fine ones, in order that the space between the blades of the two needles may be large enough for the insertion of the threader. The needles at their lower ends rest upon pins 3, set in the bracket, and are held in place by the jaws 4, of spring metal, which are fastened at their inner or right-hand ends to the bracket by a screw, 5, and steady-pins, and are held together at their outer ends so as to bind the needles by means of the clamping-screw 6. The jaws have each a V-shaped notch, which embraces the needle-shank and centers the needle. The self-centering feature is not, however, the only advantage of these jaws. Their upper part is made narrow or has a width equal to the diameter of the needle-shank, so that the space to the right of the needle-shank is vacant, and the feed-surface can be set as close as practicable to the line of sewing—closer, it may be observed, than was possible heretofore.

A vertical reciprocation is given to the needle-carrier in order to force the points and blades of the needles through the work, which is placed on the work-plate Q under the presser-foot T. The looper V and threader W, which co-operate with the needles to form the stitch, are placed above the presser-foot, and, with the latter, are carried by the movable presser-arm X, so that they are raised and lowered with the presser-foot according to the thickness of the work under said foot. The manner in which the looper and threader co-operate to form the stitch will be set forth below; but, whatever this action may be, it is evident that if the needles are to occupy the same position relatively to the co-operating devices when said needles are thrust through the work they must be raised more or less according as the said devices are raised or lowered with the presser-foot. The needle-carrier P should therefore be given a stroke whose upper limit is variable with the rise and fall of the presser-foot. The motion is imparted to the needle-carrier P from the needle-eccentric F through the rock-shaft Y, journaled at the right end in a bearing on web 2, through which it projects, and at the left end in a bearing on the end wall of the frame A. The eccentric-strap 7 is connected by the journal-pin 8 with the upper end of a link, Z, which, at the lower end, is connected by the journal-pin 9, ball 10, and block 11 with the arm 12 of rock-shaft Y. The ends of this link are forked. The top fork fits around the needle-eccentric and its strap, (the link being curved, as shown in Fig. 10, to avoid the main shaft.) The bottom fork spans the lever-arm 12. The upper end of the link Z is further connected by the pin 8 with the front forked end of a guide-arm, 13, hinged at the opposite end at 14 to a projection on the rear wall of frame A. The journal-pin 8 is fixed in the link Z by set-screws 15, and is free to turn in the eccentric-strap 7 and in the guide-arm 13.

The needle-carrier P is connected by the screw-pin 16 with the upper end of link 17, whose lower end is connected by a screw-pin, 18, with the outer end of lever-arm 19 of the rock-shaft Y. At each revolution of the shaft D the needle-eccentric F vibrates the rock-shaft Y through the strap 7, link Z, and lever-arm 12, and the rock-shaft Y in turn gives a vertical reciprocation to the needle-carrier P through the lever-arm 19 and link 17.

In order to make the stroke of the needle-carrier adjustable, the block 11 is set in a slot in the lever-arm 12, so that it can be moved toward and away from the rock-shaft. The said arm and slot are so curved (see Fig. 10) that when the eccentric and parts operated thereby are in position to force the needles through the work the center of curvature coincides with the axis of the journal-pin 8, and consequently the block 11 is then adjusted along a neutral line, or, in other words, in such direction that its adjustment moves the needle-carrier in neither direction. Thus the adjustment of the block 11 makes no change in the time at which the needles enter and leave the work, but it changes the upper limit of the needles' stroke, making it higher or not so high, according as the block is nearer to or farther from the rock-shaft. It also changes the lower limit of the stroke, although not to so great an extent. In order that these adjustments may be effected automatically, the block 11 is connected with the presser-foot T, so as to be shifted when the latter is raised or lowered. The connection is made through the rock-shaft A', called the "controller-shaft." A depending lever, A", hung and turning on the stud 20, fixed in the frame A, is connected by link 21 with a lever-arm, 22, at the right-hand end of the controller-shaft A', and is also connected by the link 23, journal-pin 9, and ball 10 with the block 11. A lever-arm, 24, projecting forward from the controller-shaft A' at the left hand end of said shaft, is connected by the link 25 with the lug 26, depending from a boss, 27, on the inner or right side of the presser-arm X near the front or outer end thereof. A screw pin, 28, tapped into the outer end of the lever-arm 24, plays in a slot, 29, in the link 25. The presser-arm is fixed at its rear end on a rock-shaft, B', journaled in bearings of the frame A. An arm, 225, fixed on the rock-shaft B' near the right end thereof, carries a leaf-spring, 226, the outer end of which presses upon a lug or short arm, 227, of lever A". The pressure of this spring tends to keep the pin 28 at the top of slot 29, its power being conveyed through the rock-shaft A' and its connections.

When the presser-foot T is lifted, the presser-arm X is moved with it, and, lifting the link 25, permits the spring 226 to turn the lever A" and shift the block 11 lengthwise of the lever arm 12, so that it is nearer to the needle-arm rock-shaft Y. At the same time the controller-shaft A' is turned and the pin 28 is raised until it is stopped by contact with the upper end of the slot 29. The position of this point, which is determined by that of the presser-foot, thus controls the position of the block 11 relative to the shaft Y. When the presser-foot descends, it pushes upon the link 25 and pin 28 and moves the block 11 away from the rock-shaft Y. The top of pin 28 thus forms a contact-surface which partakes of the motions of the adjustable part 11, and is arranged in the path of the contact-surface formed by the top of the slot 29 on the descending side of said last-named surface, which partakes of the motions of the presser-foot. The lever A" is of course turned at the same time, so that the lug presses down the front end of the spring 226; but this does not increase the pressure of the spring, because it is compensated for by the downward motion of the arm 225, which moves with the rock-shaft B' and presser-arm X. Preferably the parts are so proportioned that the spring 226 is slightly more compressed with the presser-foot T in a high than in a low position.

To prevent the controller mechanism from being accidentally shifted, and especially to prevent it from being vibrated at each stitch by the tendency of the block 11 to slide back and forth in the lever-arm 12 (when the latter is inclined) under the pull and thrust of link Z, a clamping mechanism is provided. The clamping action is made intermittent, in order that it may hold the controller mechanism at the same time, when the tendency of block 11 to slide might otherwise disarrange the proper adjustment of the needle-operating mechanism, but permit at a suitable time the free adjustment of said block by the presser-foot, the clamping action being partially or entirely relieved at such times. The clamping mechanism is operated by means of the cam I, formed by a groove in the left face of a disk, which, for convenience of manufacture, is in one piece with the needle-eccentric F, the disk and eccentric being at the opposite end of the connecting-sleeve 30. This sleeve is fixed firmly on the main shaft D.

The cam I vibrates a lever, C', whose upper end carries a roller that runs in the cam-groove, and whose lower end encircles and turns upon the needle-arm rock-shaft Y. The lever C' communicates movement to a horizontal lever, D', pivoted at 31 to an ear on the frame A and terminating in a spring-arm, 32, whose end is acted upon by the screw 33, tapped through the lever C' near its lower end. The lever C' is curved, so as to pass around behind the lever A". On this lever A", near its lower end, is fastened a tail, 34, or thin flexible strip in the form of a circular arc, (see Figs. 10 and 15,) which tail lies between the end of the stationary screw 35, tapped through the end wall of the frame A, and the clamping-block 36, fastened to the top of lever D' by a screw, 37, on which it may turn slightly in order to press squarely against the tail 34.

When the cam I moves the lever C' rearward, the latter presses upon the lever D' and forces the clamping-block 36 against the tail 34, so as to hold it with more or less pressure, depending upon the flexure of the spring-arm 32. When the cam I moves the lever C' toward the front of the machine, the pressure is relieved. When the feed-surface descends and the needles are about to enter the work, the clamping-cam I leaves the controller mechanism free, and the latter can then, and then only, be moved by the spring 226. If at this time the pin 28 is at the top of the slot, there would of course be no motion of the controller mechanism. At other times the controller mechanism is clamped.

The shape which is preferably given to the cam I and the position of the roller in the cam-groove when the needles are at the bottom of their stroke are shown in Fig. 11.

The clamping of the controller mechanism during the rise of the feed permits the presser-foot T to rise without changing the position of block 11. As soon, however, as the clamp is off, the spring 226 tends to move the controller mechanism; but the feed has then descended so far that only a small movement is possible before the pin 28 reaches the top of its slot, and at high speeds the descent is completed before the spring has moved the controller mechanism to an appreciable extent.

The presser-foot T is held down upon the work by the spring E' in the form of a flat leaf-spring, the left end of which bears against the bottom of the slot 29 in the link 25, while the right-hand end is supported by the lever F', fulcrumed on the front wall of the frame A. The end of this lever projects through a hole, 38, in the spring E', which rests upon a pin, 39, fixed in the lever. At an intermediate point the lever F' rests upon an adjusting-cam, 40, formed by a grooved cylinder, the bottom of the groove being eccentric or cam-shaped, so that when the cylinder is turned the lever F' and the right end of the spring E' are raised or lowered, according to the direction of rotation. The cam or cylinder 40 fits in the boss 42, which is slotted on top to allow the lever to enter the groove. Outside the frame A the cylinder or cam 40 has a milled head for turning the same, and also a disk, 43. A pointer, 44, is fastened on the frame A by a screw-pin, 45, and the disk 43 is marked, (by Figs. 1, 2, 3, and 4, as shown,) so as to indicate the position of the cam relatively to the lever F'. This pin 45 also extends inside the frame A and forms a stop to limit the upward movement of the presser-spring E'. This spring is held down at a suitable point between its ends by the lever G', supported and fulcrumed upon a stud, 56, fastened in a boss on the web 2. The upper end of the lever has a roller which bears against the cam H, formed by the periphery of the same disk that has the groove in its left face to form the cam I, while the lower end is provided with a pin, 57, which is set in a conical hole in the lever, so that it may rock on its upper end, and which bears upon the spring E'. As the cam H revolves, it forces down the spring E', giving an extra pressure upon the presser-foot for a certain time.

The shape of the cam-surface is shown in Fig. 11. It gives the extra pressure when the needles are thrust through the work. At other times the pressure is relieved in order that the feed-surface may act against the normal pressure only. The tension or pressure of the spring E' can be adjusted by hand for different kinds of work by turning the cam 40, it affecting both the normal and the extra pressure.

The presser-foot can be lifted from the work by hand by means of the lifting-cam 58, pivoted on the left end of the frame A just under the projection 59 on the presser-arm X. The stud 275, on which the cam turns, is set in a slot in the frame and is held in place by the nut 276, which bears upon the metal of the frame and clamps it against the washer 277, (the latter being pressed by a shoulder on the stud 275.) The stud and lifting-cam are set higher for sewing coarse work than for fine, as it is desirable then to lift the presser-foot higher for inserting and removing the work.

An attachment for lifting the presser-foot by means of a treadle or pedal, as customary in straw-sewing machines, is also provided. It consists of a lever, 60, fulcrumed on the base B, with the front end under the lower end of the link 25 and the opposite end above a hole in the base, through which passes the cord 61, for connecting it with the operating-pedal. A stop, 610, tapped through a lug on the frame A, limits the upward movement of the arm 24 of the controller-shaft and through the link 25 of the presser-arm, and thus acts as a safeguard against accidental injury to the mechanism by lifting the said presser-arm X too high. When the presser-foot is raised by the cam 58 or by the pedal, the presser-spring E' strikes the head of pin 28 and turns the controller-shaft A' positively. When the presser-foot is lowered, the upper end of the slot 29 strikes the pin 28 and turns the controller-shaft A' in the opposite direction. It is evident that if the slot 29 were long enough the presser-foot could be raised to its highest position without turning the controller-shaft A'; but the arrangement shown is preferred, because it avoids excessive bending of the spring 226, and also insures that when thicker work has been placed under the presser-foot and the latter let down on the same the controller mechanism shall adjust the block 11 to the proper position for the thick work, although the said mechanism may be clamped when the presser-foot is raised and lowered. If the controller-shaft were not turned under these conditions it is evident that when the presser-foot was let down on the thick work the block 11 would remain in the position for thin work until the clamp was released and the spring 226 was allowed to shift the controller mechanism.

The looper V and threader W, which co-operate with the needles R S, are supported on the presser-arm X inside or to the right of the needles. The looper V is attached to the outer or left-hand end of a short rock-shaft, 62, journaled in and passing through the boss 27 on the presser-arm X. The looper is vibrated by the looper-cam L, formed by a groove on the left face of the annular disk 63, which cam acts through the lever H', supported and fulcrumed at the bottom on the stud 64, fixed in the web 1, and connected at the top by link 65 with a lever-arm depending from the looper-shaft 62. (See Figs. 5 and 6.)

The upright lever H' is placed behind the main shaft, and is also curved backward in order that the joint between it and the horizontal link 65, being behind the main shaft D and in front of the shaft B', or axis upon which the presser-arm X turns, may be in such proximity to said axis that the timing of the looper is not altered to any considerable extent by the raising and lowering of the presser-foot in consequence of the different thickness of the work under it. It is evident that if the joint were in the line of said axis the motion of the presser-arm would interfere the least with the timing of the looper; but the proximity shown is sufficient for practical purposes.

The looper itself (see Figs. 38 to 41) has a hook, 66, turned toward the front of the machine, and behind the hook the upper surface is cut away at 67, leaving at 68 a shoulder or vertical wall. As shown, the looper is formed of a small rod bent in the middle, its upper end forming a shank, by which it is secured in a head on the looper-shaft 62. The shank fits in a hole bored diametrically through the head, and is fastened therein by a set-screw. The looper is moved forward as the eye-pointed needle R throws out the loop, the needles having reached the top of their stroke and begun to descend. The hook 66 then enters the loop and carries it forward past the threader W, which assists the looper in placing the loop in the hook of needle S. This threader W consists of a bar provided with a finger, 69, at the bottom, and pivoted at the top to a lever-arm, 70, (see Fig. 5,) of the rock-shaft I'. Midway of its length it is hinged to a guide-arm, 71, which turns on the screw-stud 72, tapped into the presser-arm, and is set at an angle to the lever-arm 70. The vibration of the threader-shaft I' to the left carries the threader downward, and in consequence of the greater inclination of the guide-arm 71 the lower end is at the same time moved outward. This movement takes place simultaneously with the forward movement of the looper, the finger 69 moving just behind the shoulder or wall 68 of the looper. So soon as the looper clears it the finger enters the loop, which is distended over the base of the hook 66 and carries the upper member of the loop between the needles. By the continued forward movement of the looper and outward movement of the threader the thread is pressed against and bent partly around the needle S just below the barb of the hook. On the descent of the needles (which is taking place during these movements of the looper and threader) the thread is caught in the hook of needle S, and the loop which has been thrown out by the eye-pointed needle is carried by the hook-needle through the work a short distance in front of the eye-pointed needle. (See Fig. 40.) After the hook-needle has taken the thread and before it has carried the same into the work, the looper and threader release the thread and retire (the looper first and then the threader) to await the rise of the needles for another stitch.

The threader shaft I' is vibrated by means of the threader-cam K. This cam is formed by a groove on the right of disk 63. It acts upon a roller on the front end of lever K', supported and fulcrumed on a stud, 75, and at the rear end connected (see Figs. 4, 6, and 12) by the link 76 with a lever-arm, 77, at the rear end of the threader-shaft I'. The stud 75 is fixed in the wall of the frame A. The joints at the ends of link 76 are ball-joints.

The joint between the rear end of the horizontal lever K' and the lower end of the upright is above and in close proximity to the shaft B', or axis upon which the presser-arm turns. When, therefore, the presser arm is raised or lowered, the axis upon which the link turns being so nearly coincident with that of the presser-arm, the different positions of that arm within the small limits of its motion do not affect to an appreciable extent the operation or the timing of the threader.

The shape of the threader-cam is shown in Fig. 12. The annular disk 63 is fastened to a hub or center, 78, which is fast on the main shaft D.

Below the work-plate is a take-up, L', consisting of a lever-arm with an eye or thread-guide, 79, loosely confined in a hole in the take-up, said arm projecting obliquely through the end wall of frame A from a rock-shaft, M', which is journaled in bearings of said frame A and is vibrated at the proper times by the take-up cam G through the arm 80 at the right end of the take-up shaft M'. This cam is formed by a groove in the face of the cam-disk, which fits over a hub on the connecting-sleeve 30, and is bolted to the disk of cams H I. The arm 80 carries a roller which runs in the cam-groove. The shape of the groove is shown in Fig. 10.

The take-up is at the top of its movement during the first half of the descent of the needles, but then it descends slightly in order to get out of the way of the descending needles, and remains in the position shown in the drawings until the needles have finished their descent. Simultaneously with the rise of the needles the take-up descends and draws upon the thread. When the needles have penetrated the work so far as to bring the thread on the hook-needle against the bottom of said work, the take-up stops and remains stationary until the barb of the hook-needle has passed into the work and cast off the loop, whereupon it again descends and draws the cast-off loop around the eye-pointed needle, as shown in Fig. 41. By the time the eye of the needle R has reached the work, or slightly thereafter, the take up has reached the limit of its descent. It then immediately commences to ascend gradually with the needles; but when the needles have almost reached the top of their stroke it finishes its ascent suddenly in order to free the thread entirely, so that the loop may be more certainly thrown by the eye-pointed needle in the path of the looper. The tension is of the intermittent or automatic type, and the operation or effect of the take-up on the thread is governed by the action of said tension, since if the tension be open the take-up will draw from the spool, and not from the needles. The intermittence or opening and closing, instead of being effected at equal intervals, as heretofore always the case, is effected at different times for different lengths of stitch. It is thus a variably-intermittent tension.

The tension apparatus proper and the device which is actuated by the tension-cam for opening and closing the said apparatus are shown in Figs. 7 and 9.

The sleeve 81 fits in a boss on the front wall of the frame A, and is connected by a screw, 228, with the link 229, whose opposite end is jointed to the lever N', supported and fulcrumed on the stud 94, screwed into an ear on the rear wall of the frame A. The screw 228 plays through a slot in the boss, which prevents the sleeve 81 from turning. The link 229 and lever N' hold the sleeve 81 from endwise motion, except when said lever is turned for the purpose of moving it and thus changing the degree of tension exerted on the thread. There is a friction-washer, 113, under the head of stud 94, which serves as a retaining device to the lever N' and prevents it from moving except when sufficient force is applied to overcome the friction. At the rear or inner end of this sleeve 81 is a nut, 82, which fits the bore of the sleeve and is movable lengthwise thereof, but is prevented from turning by the side projections, 83, which enter grooves or slots in the sleeve. The tension-stud 84 is journaled at the front in the sleeve 81 and at the back is supported in the nut 82, which engages the screw-thread on said stud. The threaded part of the nut is split, so as to exert elastic pressure in the screw-thread for holding the nut in place. The tension-spring 85, in the form of a spiral compression-spring, is interposed between an internal shoulder on the sleeve 81 and an exterior shoulder at the rear of the tension-nut. The spring is compressed more or less by turning the stud (which for the purpose is provided with a milled head) in one direction or the other. The tension-disks or washers 86 and 87 are placed on the stud, the inner one, 86, resting against a boss on the face of frame A, and the outer one, 87, being confined by an external shoulder on the stud. The disks or washers are drawn together by the tension spring with more or less pressure, according to the compression of said spring. This pressure is relieved at the proper times by the lever 88, supported and fulcrumed at the bottom on the stud 89, fixed on the web 1 of the frame A and actuated by the cam J. A screw, 809, tapped through a projection on the left side of said lever, strikes the end of the tension-stud 84 at the proper times and opens the tension. A torsion-spring, 90, Fig. 5, with one end in a hole in web 1 and the other in a hole in the hub of lever 88, keeps the roller at the top of the latter always in contact with the operating or tension cam J. This cam J is mounted on the main shaft D in such a way that it is rotated therewith, but is movable lengthwise of the same. As shown (see Fig. 8) it fits loosely on the shafts and is connected with the hub or center 78 (fast on the shaft) by means of the pin 91, screwed into the right face of said hub at one end and at the other entering a hole in tension-cam. A ring, 92, somewhat larger in diameter than the end of the pin, fits snugly the hole in the cam. This ring is fixed to the pin by an axial screw, 93, tapped into the pin and passing through a slightly larger hole in the ring and having a shoulder or enlargement to bear against the outside of the latter. The pin might fit directly in the hole in the cam; but the construction shown is preferred as giving a more perfect joint. The tension-cam J is adjustable lengthwise of the shaft by means of the lever N'. The lever has a fork which embraces and supports a ring, 95, pivoted thereto by pins 905, tapped through the members of the fork at diametrically opposite points on the ring. The ring itself fits over the reduced end of the tension-cam (which end is slightly less in diameter than the interior of said ring) and is confined but not clamped by the nut 96. The upper member of the fork is extended beyond the pivot-pin, and after passing through a wide notch in the upper edge of the front wall of the machine-frame terminates in a handle, 97. By moving this handle right or left the tension-cam is carried along the shaft D, the slight movement of the ring 95 between the nut 96 and the end of the cam preventing any cramping. The bottom of the notch is provided with a series of holes for a pin, 98, (see Figs. 2 and 4,) with which to limit, when desired, the movement of the lever N'. When the cover C is closed, it prevents the pin being removed or changed in position.

The front wall of frame A is further provided with a series of ratchet-teeth, 230, and the handle of lever N' has a pawl, 231, which when engaged with the ratchet-teeth prevents the motion of the handle to the left, but permits it to be moved to the right. The pawl is set in a slot in the handle and secured by a pivot-pin. A spring, 232, presses it down to engage the ratchet-teeth. The pawl is so arranged that the operator in catching hold of the handle will naturally press it in, and thus disengage the pawl, so that the lever can be moved in either direction. The special object of this pawl is to prevent the resistance of the work on the feed from shifting lever N', as explained at length hereinafter.

The periphery of the tension-cam is provided with four inclines, 100, 101, 102, and 103, (see Figs. 23 to 25,) connecting concentric surfaces and extending the length of the cam. The inclines 100 and 102 force the lever 88 outward and release the tension. They are parallel with the axis of the cam, so that no matter what position the tension-cam J may occupy on the shaft the tension is opened at the same point in its revolution. The same is true of the incline 101, which allows the tension to close after it has been opened by the incline 100. The latter opens the tension just after the needles commence to descend, and it is held open during the insertion of the thread in the needle-hook by the joint action of the looper V and threader W. The object of having it open at that time is to leave the thread free to be drawn upon by the looper and threader, and so soon as they have finished their forward or outward movement the tension is closed. The incline 102 comes into action as the needles leave the work, at which time the feed commences to advance the same. The object of opening the tension at this time is to allow the feed freely to draw as much thread as may be necessary. As considerably more thread is required in long than in short stitches, the tension remains open a time proportionate to the length of stitch and depending upon the position of the tension-cam J on the shaft D. The incline 103, which allows the tension to close after it has been opened by incline 102, extends obliquely around the cam, as shown in Fig. 5. The farther, therefore, the cam J is to the right the later in the revolution does the said incline 103 reach the roller of lever 88 and the longer is the tension held open. The point at which the closure takes place is indicated for the extreme right, the middle, and the extreme left positions of the tension-cam J by the position of the incline 103 in Figs. 23, 24, and 25, respectively. This closure always takes place before the needles enter the work, and consequently also before the take-up has finished drawing in the thread, so that the take-up will tighten the stitch as much as it can, and will draw in the loop when it is released by the hook-needle S. For the shortest stitch it takes place very soon after the needles leave the work and before the take-up, which has stopped after descending out of the way of the needles, resumes its descent. For the longest stitch the tension is held open until the needles are ready to enter the work, which, it may be observed, is when the feed has about finished its forward movement, the tension-cam being set as far as possible to the right. For intermediate lengths of stitch the tension is held open for an intermediate time, the tension-cam being set in an intermediate position nearer to the right or left as the stitch is longer or shorter than the mean.

In order to effect the adjustment in the best manner the tension-cam is connected with the device or devices for changing the feed movement. To this end the tension-cam is utilized as a feed-slide to shift the position of the variable feed-eccentric M. This eccentric has a slot, 104, through which the shaft D passes freely, and it is connected with the hub 78 by a dovetail tongue, 105, parallel with said slot, which slides in corresponding ways, 106, on the left face of said hub. The lever 107, pivoted in a radial notch, 108, in the periphery of hub 78, has its left end in a hole in the eccentric, so that the rocking of said lever will move the axis of the eccentric M toward and away from the axis of the shaft D in order to diminish or increase its eccentricity, as may be required. A ball, 109, forming part of an axial screw on the left end of the lever, fills the hole and allows motion to be communicated from the lever to the eccentric without cramping or lost motion. The opposite or right-hand end of the lever 107 is provided with a ball-screw, 110, and socket 111, surrounding the ball, said socket being, externally, of cylindrical form and fitting the inclined hole 112 in the tension-cam J, or having reference to its present function, the feed-slide J. When said cam or slide is moved to the left, the right end of the lever 107 is moved away from the shaft D and the eccentric M is drawn toward the shaft, so as to lessen its eccentricity, and consequently lessen, also, the stroke communicated by it to the feed-surface. When, on the other hand, the feed-slide J is moved to the right, the eccentricity is increased and the stroke or length of stitch is increased also.

The feed-surface P', Figs. 3, 16, 17, and 18, is attached to a lateral projection, 114, of the arm 115 of feed-bar Q', which latter is hinged to the upper end of feed-rocker R', the rocker being fast at the bottom on a rock-shaft, 116, journaled in bearings of the left end wall and the web 2 of frame A.

The feed-bar is connected with the feed-lifting eccentric N by the link 118, and the variable eccentric M by the lever 120 and eccentric-strap 125. The feed-bar and feed-rocker are given long bearings, or rather the two journals are set quite a distance apart, in order to resist the side strains produced by the pressure on the feed-surface in consequence of said surface being at the end of a lateral projection and not directly over the bearings. The shaft 121 is fast in the top of the feed-rocker R', and the projecting ends form journals for the feed-bar. The link 118 encircles the eccentric N and is connected with the arm 115 at the front end of the same by a tongue, 123, on said arm fitting and sliding in a groove in the link. The lever 120 is connected by the journal-pin 124 with the strap 125, which encircles the variable eccentric, and by the journal-pin 126 with the front end of an arm, 127, of the feed-bar. The lever is recessed at 128 to receive the end of this arm 127, and on the opposite side it is provided with a boss, 129, in which the pin 126 is journaled, said pin being fastened to the arm 127 by a nut. The journal-pin 124 is fastened to the lever 120 by a nut, and has its bearing between the body of the eccentric-strap 125 and a cap-piece, 130, bolted to the same. The lower end of the lever is connected by a ball-joint with the front end of link 131, this joint constituting the fulcrum upon which the lever turns in giving the back-and-forth movement to the feed. The other end of link 131 is connected by a ball-joint with the horizontal arm of lever N'.

The lengths of the different lever-arms are so proportioned that when the feed-surface is at the forward limit of its motion (the position shown in Figs. 16, 17, and 18) the shifting of the variable eccentric M and the movement of horizontal arm of lever N' will tend simply to swing the lever 120 on the pin 126 as a center and will produce no change in the position of the feed-bar. Thus the feed-surface will always rise at the same place and the changes in the feed will take place at the farther limit of its movement.

The path of the feed-surface is indicated in Fig. 18, the line 133 representing the path in making a long stitch, and the line 134 the path when a short stitch is made. The position of the parts when adjusted to produce a long stitch, and when the feed-bar is at the forward limit of its motion, is shown in full lines in Figs. 16, 17, and 18, and their position when adjusted to produce a short stitch is indicated in dotted lines, the feed-bar not changing its position.

The feed-surface not only has a rising-and-falling and back-and-forth motion, but is also rocked on a horizontal axis, so that when the feed-surface rises the heel or rearmost part first makes contact with the work, and when it descends the toe or front end is the last to leave the work. The rocking movement is caused principally by the position of the journals of the feed-bar or shaft 121 behind the journals of the feed-rocker R' or shaft 116. In consequence of this position of the journals the rocker is inclined to the rear, and the arc through which the shaft 121 moves in feeding the work is a descent, so that the rear end of the feed-bar is carried down, and the said feed-bar is turned on the lifting-eccentric N as a center. The toe of the feed-surface, being in front of the eccentric, is lifted as the shaft 121 is carried down. The longer the stitch the longer the arc through which the shaft 121 descends, and the more the feed-surface is rocked by the turning of the feed-bar on the eccentric N. It is with long stitches that the rocking motion is most important.

The feed-surface P' is fastened to a block, S', by means of the screw 135, passing through a hole in the block and tapped into a tongue on the bottom of the feed-surface, which tongue fits in a groove in the top of the block. The block S' has on the inner or right-hand face a groove, which the end of the projection 114 enters. (See Fig. 8.) The block is held in place by the conjoint action of the screw 137, the spring or friction washer 138, and the adjusting device 139. The screw is tapped into the projection 114. The adjusting device is provided with an eccentric, 140, which plays in a cross-slot in the block S', so that by turning the milled head of said device the block S' and the feed-surface carried thereby can be adjusted vertically. A pin, 141, fixed in the projection 114, enters a semicircular groove, 142, in the adjusting device and prevents the latter from being turned too far by coming into contact with the ends of the groove 142.

The eccentrics for operating the feed-bar are so adjusted that the feed-surface rises as the needles descend, and the reverse, and that the advance movement (toward the rear of the machine) which feeds the work takes place while the needles are below the work. In order to give the proper timing with eccentrics without being obliged to give a full half of the needle-stroke below the work the eccentric straps 7 and 125 are pivoted, respectively, to the link Z and lever 120, as close to the eccentric as possible, so that these straps act as very short pitmen and prolong the time during which the parts operated by said eccentrics have a very slow movement in consequence of the eccentrics being on the opposite sides of the shaft from the pivots of their respective straps. The prolonged slow movement takes place for the needles when the latter are at or near the bottom of their stroke, while for the feed it takes place during the rise of the feed-surface. The advance, or at least the effective advance, of the feed does not, therefore, commence as soon as it would, (except for the shortness of the eccentric-strap 125,) and takes place more quickly. Consequently the time during which the needles must be out of the work is shortened, and the movement which they must be given in this time is lessened in consequence of the delay or prolonged slow movement at the bottom of the needle-stroke.

The arrangement of the feed-eccentric M and its strap tends to make the feed-surface advance more nearly in a straight line by shortening the time of the advance.

The pull and thrust of the eccentric M being exerted upon the lever 120, it is evident that this pull and thrust are conveyed not only to the feed-bar Q', but also through the link 131 to the lever N', and that the amount of pull and thrust thus exerted upon the lever N' are proportionate to the resistance applied to the upper end of lever 120 by or through the feed-bar.

When the presser-foot is lifted and there is no work in the machine, the resistance thus applied (outside that due to the very slight friction of the well-oiled joints) is due to the inertia of the feed-bar, which causes at each end of the stroke a shock or sudden pressure, greater as the speed of the feed-bar is greater and the reversal of motion is more sudden.

In consequence of the shortness of the strap 125 the reversal at the end of the feeding movement or rear end of the stroke is more sudden than at the beginning of said movement or front end of the stroke, and therefore the greater pressure is then applied to the lever 120 and conveyed by it and link 131 to the lever N'. This greater pressure tends to move the lower end of the lever 120 toward the front of the machine and to shift the lever N' and parts connected with it in the direction to lengthen the stroke of the feed; and if the friction of the retaining-washer 113 be not too great the lever N' and parts connected with it will be moved and the stitch gradually lengthened until the movement is arrested by contact of the handle 97 of the lever N' with the pin 98. The pressure (caused by the inertia) being greater as the speed is higher, the friction of the washer 113 can be so adjusted that it resists the said pressure while the machine is running slowly; but as the speed increases it is overcome thereby, and the shifting of the feed-controlling devices (and the tension devices connected therewith as well) takes place. This adjustment of the friction is or may be made once for all by using a spring-washer of proper form and shape.

When the work is in the machine, the resistance of the work upon the feed-surface tends to cause a movement of the lower end of lever 120 to the rear of the machine and move the lever N' and parts connected therewith in the direction to shorten the stitch. The pawl 231, engaging the ratchet-teeth 230, prevents this motion and does not interfere with the motion in the opposite direction.

It will of course be understood that, were it desirable, the washer 113 could be made so stiff that it would resist pressures produced by the running of the machine, while permitting lever N' to be adjusted by hand.

The guides for directing the straw braid to the needle are similar to those heretofore used in the Willcox & Gibbs straw-hat-sewing machine described in Letters Patent granted to Charles H. Willcox, No. 218,413, dated August 12, 1879, and No. 246,700, dated September 6, 1881; but several modifications have been made in said guides in order that they may operate with the other parts of the machine, as well as to adapt them to a wider range of work and to improve the operation.

The presser-foot T and work-guide T' (see Figs. 26 to 37) are attached to a flat projection, 145, on the left of the presser-arm X by means of the thumb-screw 146, which passes through the said projection and is tapped into a tongue, 147, on the work-guide. This tongue is preferably made in two parts, held together by the screw 148, although it could be in one piece. The tongue fits in a groove, 149, in the presser-foot T, which is upheld by the underlying body of the work-guide. The bottom of the projection 145 has depending side flanges, 150, between which the upper part of the presser-foot is set. (See Figs. 31 and 32.) The thumb-screw 146 passes through a slot, 151, in the projection 145, so that the work-guide can be moved back and forth across the line of stitching, being guided by the groove 149 in the presser-foot. The presser-foot is prevented from moving with the work-guide by means of the screw 152, tapped into the presser-foot, whose head enters a notch, 153, in the under surface of the projection 145. The left end of the tongue 147 has a slot, 154, through which the screw passes. The movement or adjustment of the work-guide is effected by the lever V', which is fulcrumed by means of the pin 155, and through a hole in which lever V' the thumb-screw 146 passes. The pin 155 is fixed in the lever and enters an elongated hole or notch, 156, (see Fig. 4,) in the projection 145. By turning the lever the work-guide is adjusted so as to bring the guiding-edge 157 nearer to or farther from the line of stitching. It is retained in the position to which it may be adjusted by the friction-washer 158 between the head of the screw and the adjusting-lever.

The work-guide is provided with a separator, 159, at its front end, as usual, for holding the work or sewed braid away from the entering braid to be united to the former. It is preferred to have the toe or front part of the presser-foot and work-guide, respectively, broad, as shown in Figs. 33, 34, and 35, the toe 160 of the presser-foot overlying the toe 161 of the work-guide. This construction is, however, practicable only for thick braid in consequence of the depth of the braid-guide W', which should extend past the said toes. For thin braid the toe of the presser-foot is made narrow, as shown at 162, Figs. 27 and 29. For narrow braid it is preferred to provide the bottom of the presser with an offset or shoulder, 163, which is or may be used as a guiding-edge on the left of the line of stitching. The braid at the edge of the work (numbered 199 in Figs. 1, 2, and 3) to which the entering braid 202 is to be stitched has its edge against the work-guide, while the preceding braid or braids lie in the recess to the left of the shoulder 163.

For coarse braid having a rough edge, or "head," as it is called, the presser-foot and work-guide are provided on the bottom, at the left edge of the same end, with ribs 164 and 165, respectively. The head of the braid lying to the right of these ribs is protected from the pressure of the feed-surface, which acts upon the part under the ribs. For all kinds of work the presser-foot has a needle-throat, 166, and is recessed at 167 to allow the looper and threader to operate as close to the work as possible. To insure accuracy in adjustment, the presser-foot is or may be provided with graduations, as shown in Figs. 27 and 29, and the work-guide has a mark or line to serve as a pointer, as shown in Figs. 26 and 27.

The braid-guide W' (see Figs. 1, 2, and 3) is attached to a carrier slide, Z', by means of the screw 168, which passes through a round hole in the base of post 169 and a slot in the braid-guide, and is tapped into the carrier-slide Z'. The latter has a tongue, 170, which fits in a groove in the back of the braid-guide. The base of the post 169 has a tongue, 171, (see Fig. 3,) which fits in a groove in the face of the braid-guide. A friction-washer, 172, between the head of screw 168 and the base of the post produces by its pressure sufficient friction to retain the braid-guide in position and yet permit it to be adjusted on the carrier-slide Z' when desired. The adjustment is effected by the pinion 173 engaging a rack, 373, on the lower edge of the braid-guide. This pinion is on a short hollow shaft provided with a milled head and turning freely upon a journal-pin, 174, (see Fig. 7,) screwed into the carrier-slide. The latter is set in a groove in the frame A, and is held therein by the screw 175, passing through a slot, 176, in the carrier-slide and tapped into the machine-frame. A friction-washer, 177, under the head of the screw prevents accidental movement of the carrier-slide, but allows it to be adjusted by applying sufficient force.

An adjustable stop, 233, is provided for enabling the braid-guide, when adjusted, to be moved away from the needles, and then, without special care on the operator's part, to be returned to the precise position it occupied before. This stop, whose shape is shown in Figs. 2ᵃ and 2ᵇ, is set in a slot, 234, in the braid-guide, and is clamped in any desired position by the screw 235 and washer 236. On the face of the carrier-slide Z' there is a projection, 237, which extends into the groove in the back of the braid-guide and lies in the path of the stop 233. The latter makes contact with this projection and arrests the motion of the braid-guide.

In use the stop 233 is set in such position in slot 234 that when the stop is in contact with the projection 237 the braid-guide is in proper relations to the needles to guide the entering braid to the same. When the braid-guide has been moved away from the needles, it is only necessary to return it until the stop 233 again comes in contact with the projection 237, in order that it may occupy the same position as before.

For the purpose of adjusting the carrier-slide Z', a boss, 178, Fig. 7, on the back thereof projects through a slot in the frame into a groove, 179, in the face of lever C''. This lever is suspended from a journal-screw, 180, tapped into the machine-frame, and is provided at the bottom with a handle, 181, screwed into the lever and playing in a slot in the machine-frame. By moving this handle right or left the carrier-slide Z' and the braid-guide with it are adjusted. By turning the pinion 173 the braid-guide is adjusted independently of the carrier.

The advantage of the double adjustment is that in sewing a hat it is desirable in certain parts to lap the braid more than in others. The position of the braid-guide determines this lap, because the farther the braid-guide is to the left the farther the left edge of the braid (the width thereof being the same) will be outside the line of stitching. If then the braid-guide be adjusted by the pinion 173 so as to give what may be called the "normal" lap, it can be adjusted by the lever C'' to give an extra lap and then returned to the normal position without changing the normal adjustment at all.

A hand-operated eccentric, D'', fastened on the face of the frame A by a screw having a friction-washer under its head to retain the eccentric in position, is placed so as to form an adjustable stop for the handle 181 of lever C''. By setting this eccentric in proper position the operator will always have a sure means of giving the proper amount of extra lap so long as the work is the same. Thus when one hat has been sewed it will only be necessary in sewing the next one to move the lever C'' until its motion is arrested by the eccentric, in order to give the proper amount of extra lap. By turning the eccentric as far as possible to the right all movement of the lever C'' may be prevented.

To assist in adjusting the braid-guide for different kinds of work, the said guide is graduated, and a pointer, 183, is fastened on the machine-frame opposite the graduations. The post 169 has two holes in the top and a clamping-piece, 184, held down by a set-screw, 185, for confining the end of the guide-pin E'' in either hole. The end of the pin is cut away on top in order to give a flat surface for the clamping-piece to act against. The braid-guide is provided with two holes for the reception of the guide-pin. For very thick braid it is placed in the outer hole, and for braid which is not so thick in the inner one. The braid-guide W' also carries a guide, F'', Fig. 2, for the outer or left edge of the entering braid. It has a pin which fits in a hole in the braid-guide, and the under side of this pin is toothed, so as to be engaged by a pinion at the inner end of the small shaft 186, which can be turned by a milled head on the outer end thereof. The pinion is formed integral with the shaft, and is of the same diameter therewith, so that it can be inserted from the front through the hole which receives the shaft. The latter is prevented from being withdrawn by a wire, 182, which engages an annular groove in the shaft. The braid-guide is also provided with a finger, H'', for holding down the right edge of the entering braid.

The thread is drawn from an outside spool of any ordinary or suitable description, and is passed through a hole in the handle 187 of cover C and through the two thread-guides 188 to the tension. The thread-guides 188 are formed by eyes in the heads of pins set in the machine-frame. From the tension the thread is led to the take-up through the thread-guide 189, formed by a short tube set obliquely in the piece which forms a guideway for the needle-carrier at the corner of the machine-frame. This thread-guide and the take-up are so arranged that the thread can readily be drawn through the tension. The cover C when closed is engaged by a spring-latch, 190, to hold it shut. The latch is provided with a knot, 191, which projects through the front wall of the machine-frame A and is pressed upon in order to release the latch.

The ways of the needle-carrier are protected as much as possible by a slide, 192. A box or case, 193, hinged to the machine-frame, incloses the feed-surface and its supporting-block, also the needles and the take-up, and protects them from contact with the work. By turning the box or case aside into the position shown in Figs. 1, 2, and 3 access is given to the inclosed parts. The base B is to be screwed to the work-table. The frame A has rounded projections 194 at the back, which projections rest in the hollow bosses 195 at the back of the base and form a sort of hinge on which the machine can be tilted back. The base has a raised border, 196, into which the bottom edge of the frame A sets, and the openings through the base are all formed in bosses, so that the base will catch and retain the drippings of the lubricating-oil. When the frame A is on the base, the teats 197 enter holes in the frame, washers 198, of leather or other soft material, being placed in recesses in the frame, so as to be interposed between it and the base.

The operation and manner of using the machine are as follows: The thread from the spool is passed through the thread-guides 188, to and between the disks 86 and 87, over the tension-stud 84, then through the tubular guide 189, through the eye 79 of the take-up L' from right to left, and finally through the eye of the needle R from left to right. A work-guide, T', and presser-foot T, adapted to the work in hand, having been secured on the projection 145 of the presser-arm X by the screw 146, common to both, the work-guide T' is adjusted by the lever V' to bring the guiding-edge 157 into the desired proximity to the line of stitching, in order that the latter may be at the proper distance from the edge of the overlying braid or plait 199, Figs. 1, 2, and 3. The braid-guide W' is adjusted by the pinion 173 to give the normal amount of lap to the entering braid 202, which underlies the sewed braid 199, and the eccentric D'' is so adjusted that it will arrest the lever C'' when a suitable amount of extra lap has been given by shifting the carrier-slide Z'. The stop 233 on the braid-guide is also adjusted into contact with the projection 237 on the carrier-slide and clamped. The guide-pin E'' is placed in the proper hole in the braid-guide W' and post 169, and the guide F'' for the left edge of the braid is used or not, as desired; likewise the finger H''. The feed mechanism is also adjusted by means of lever N', so as to give the proper length of stitch, and the degree of tension is adjusted by turning the tension-stud 84. A feed-surface adapted to the work is also placed on the feed-bar. It is desirable in sewing around small circles, as in making the tip or crown of a hat, to use a short stitch and then to increase the length as the sewing becomes straighter. In each class of work there will be a certain limit beyond which it is not desirable to lengthen the stitch, and the pin 98 can be set to prevent the operator from accidentally exceeding this limit. At the same time that the feed is regulated, and by the same movement, the tension-cam J is set in the proper position for opening and closing the tension, and the degree of tension exerted by the tension apparatus is also varied by shifting the sleeve 81. The pressure of spring E' for holding down the presser-foot is also adjusted by turning the cam 40, and the position of the cam 58 for lifting the presser-foot is adjusted by setting the stud 275 higher or lower in its slot. The presser-foot T being lifted by the hand-cam 58, the work is introduced under the same, with the edges of the braid against the edges of the appropriate guides, as shown in Figs. 1, 2, and 3. The presser-foot is dropped and the machine started by turning the main shaft D.

Assuming the parts to be in the position represented in the principal views, the needles rise and the feed-surface descends. As it descends, the presser-spring E' forces down the presser-foot T until it clamps the work beneath it against the work-plate Q. At the same time the controller mechanism is shifted, and the block 11 in the slotted arm 12 is moved to the proper position from which it had been withdrawn by lifting the presser-foot. The lowest point of the controller-clamping-cam I is now opposite the roller, and consequently does not oppose any resistance which the normal pressure of the presser-spring E' could not readily overcome. As the needles begin or are about to puncture the work, the extra pressure is applied to the presser-spring by the extra-pressure cam H, in order that it may resist the upward thrust of the needles R S. The controller-clamping cam I also operates to clamp the tail 34 with greater force, so as to prevent the block 11 from shifting. Just before the needles R S reach the top of their stroke (the limit of which depends upon the height of the presser-foot T above the work-plate Q, which height determines through the controller mechanism the position of the block 11) the take-up L', which has descended to the bottom of its stroke and has also risen part way during the rise of the needles, by a quick movement finishes its upward stroke and releases the thread, so that when the needles descend the loop is thrown out in front of the looper V. (See Fig. 38.) The latter now advances and carries the loop past the hook-needle S, while at the same time the threader W is thrown outward at the bottom and carries the upper member of the loop between the needles, (see Fig. 39,) thus partly wrapping the thread around the blade of the needle S, just below the barb of the hook. The looper and the threader draw the thread necessary through the tension, which is opened by the tension-cam J at the beginning and closed at the end of the movements. The needles continuing their descent, the hook-needle S catches the loop and carries it down through the work, the looper V at the same time retiring and giving up the thread to it, and the threader W also withdrawing so soon as the looper has moved back. As the needles descend below the work, the feed-surface P', which, while the needles were in the work, had been returned into position for a new feed and had been raised slightly above the level of the work-plate by the eccentric N, commences to advance the work. The feed-surface in order to act lifts the work slightly, said work being held down by the normal pressure of the presser-spring E', which was relieved of the extra pressure produced by the cam H just after the needles reached the top of their stroke. This lifting of the presser-foot T does not affect the controller mechanism, because the slot 29 in link 25 permits it to be lifted the necessary distance independently of said mechanism. At the same time that the feed commences to advance the work, or a very short time thereafter, the tension is opened by the incline 102 of the tension-cam J, and the take-up L' also descends a short distance, in order to be out of the way of the needles. The tension remains open a greater or less time, according to the length of stitch. In short stitches it is closed when the needles reach the bottom of their stroke. (In the case of the shortest stitches it may be a little before.) In long stitches it remains open until the feed has finished advancing the work, the thread being drawn from the spool through the open tension, as required. The take-up, which has remained stationary after descending out of the way of the needles, descends farther as soon as the needles rise. If the tension be closed, it draws in the thread as it is slackened by the needles and keeps it stretched between them and the work. When the tension is held open because of the length of stitch, the take-up moves idly until the closure is effected, when for the remainder of its stroke it draws in the slack. Its effective movement is thus variable, in consequence of the variation in the time of closing the tension. While the tension is open the feed draws upon the thread faster than it is given up by the needles, and thus keeps it stretched between them and the work. The feed always, even in the shortest stitches, carries the work so far that the loop which has been carried down by the hook-needle S overlies the point of the eye-pointed needle R, (see Fig. 40,) so that the latter on rising enters the loop. When the needles enter the work, the take-up L' pauses, and then, as the loop is pushed off, the barb of the hook-needle S, by a quick movement, finishes its downstroke and draws the loop around the eye-pointed needle. (See Fig. 41.) As the needles reach the work, the feed goes out of action, and the extra pressure is applied to the presser-spring E' in order to resist the thrust of the needles. The pressure for clamping the controller mechanism is also relieved just before the feed goes out of action; but except to a slight extent at slow speeds no resetting of said mechanism occurs unless the thickness of the work has been altered or the presser-foot has been lifted for some reason. During the running of the machine the operator can lift the presser-foot T by the pedal connected with the lever 60 without stopping the machine. After the needles have reached the top of their stroke they descend, the take-up finishes its upward movement, the looper V and threader W come into action, the tension is opened to give thread to the looper and threader, and the operations proceed as before.

In beginning a hat at the tip the lever N' is generally set to make the shortest stitches, and the machine is run slowly. As the circles increase, the operator increases the speed of the machine, and when a certain speed is reached the said lever N' is gradually moved toward the right end of the machine, and with it the shell 81 is moved outward to diminish the degree of tension, the tension-cam J is moved to the right to increase the time during which the tension apparatus is held open during the feeding movement, and the eccentric M is moved away from the shaft D to lengthen the stroke of the feed-bar. If the length of stitch is changing too rapidly, the operator slackens the speed, and if it becomes necessary to shorten the stitch at any time the handle 97 is grasped, the pawl 231 is lifted from engagement with the ratchet-teeth 230, and the lever N' is moved the proper distance toward the left end of the machine.

It is obvious that modifications can be made in the details of construction and that parts of the invention may be used without the others without in either case departing from the spirit of the invention.

Having now fully described our said invention and the manner of carrying the same into effect, what we claim is—

1. The combination, with the needle-carrier and presser-foot arranged on opposite sides of the work and looping devices arranged on the same side of the work as said presser-foot and movable with the latter, of needle-operating mechanism having an adjustable part whose adjustment regulates the forward limit of the needle-stroke, and controller mechanism connecting the said adjustable part with the said presser-foot, and thereby causing the forward limit of the needle-stroke automatically to conform to the higher and lower positions of the looping devices, substantially as described.

2. The combination, with the needle-carrier and the presser-foot arranged on opposite sides of the work, the eye-pointed needle, the hook-needle, and the looper and the threader arranged on the same side of the work as the presser-foot and both movable with the latter, of the needle-operating mechanism having an adjustable part whose adjustment regulates the forward limit of the needle-stroke, and controller mechanism connecting the said adjustable part with the said presser-foot, and thereby causing the forward limit of the needle-stroke to conform automatically to the higher and lower positions of the said looper and threader, substantially as described.

3. The combination, with the needle-carrier, the presser-foot, and the needle-operating mechanism having an adjustable part whose adjustment regulates the needle-stroke, of the controller mechanism connecting the said adjustable part with the said presser-foot and being provided with a loose joint formed by a contact-surface which partakes of the motions of the said presser-foot and a second contact-surface which partakes of motions of said adjustable part and is arranged in the path of the first-named surface on the descending side thereof—that is to say, on the side to be struck by the first-named surface on the descent of the presser-foot—so that on the rise of the latter said surfaces may separate, and thus permit the presser-foot to rise without necessarily carrying the said adjustable part with it, substantially as described.

4. The combination, with the needle carrier, the presser-foot, and the needle-operating mechanism having an adjustable part whose adjustment regulates the needle-stroke, of the controller mechanism connecting said adjustable part with said presser-foot and being provided with a loose joint formed by a contact-surface which partakes of the motions of the said presser-foot and a second contact-surface which partakes of the motions of the said adjustable part and is arranged in the path of the first-named surface on the descending side thereof, and a spring tending to force the second contact-surface against the first-named surface, substantially as described.

5. The combination, with the needle-carrier, the presser-foot, and the needle-operating mechanism, of the controller mechanism connecting said adjustable part with the said presser-foot and being provided with a loose joint formed by a contact-surface which partakes of the motions of the said presser-foot and a second contact-surface which partakes of the motions of the said adjustable part and is arranged in the path of the first-named surface on the descending side thereof, the spring tending to force the second contact-surface against the first-named surface, and the controller-clamp, controller-clamping cam, and connections whereby the tension of the spring is automatically resisted or allowed to operate to shift the said adjustable part at proper periods, substantially as described.

6. The combination, with the needle-carrier and presser-foot arranged on opposite sides of the work, the looping devices arranged on the same side of the work as said presser-foot and movable with the latter, and the controller mechanism connected with the said presser-foot, of the needle-operating mechanism having an adjustable part whose adjustment is effected automatically by said controller mechanism and regulates the forward limit of the needle-stroke in conformity with the higher and lower positions of the said looping devices while maintaining constant the time at which the needles enter and leave the work, in consequence of the adjustment of said adjustable part being along a neutral line when the needle-operating mechanism is in position for the needles to enter the work, substantially as described.

7. The combination, with the needle-carrier, of the needle-operating mechanism comprising the needle-operating eccentric, the rock-shaft having lever-arms connected one with the said needle-carrier and the other with said needle-eccentric, and an adjustable block which can be slid back and forth on one of said lever-arms toward and away from the axis of oscillation of said rock-shaft, motion being conveyed from the needle-eccentric through said adjustable block, so that its adjustment regulates the needle-stroke, substantially as described.

8. The combination, with the needle-carrier and presser-foot arranged on opposite sides of the work, the looping devices arranged on the same side of the work as said presser-foot and movable with the latter, and the four-motion feed mechanism having its feed-surface on the same side of the work as the said needle-carrier, of the needle-operating mechanism having an adjustable part whose adjustment regulates the forward limit of the needle's stroke, the controller mechanism connecting said adjustable part with the said presser-foot and being provided with a loose joint whose parts separate by the rise of the said presser-foot, the spring tending to close the said parts of said joints, the clamp which resists the spring when said clamp is applied, and the controller-clamping cam and connections whereby the said clamp is applied during the rise and fall of the said feed-surface and is released when the feed goes out of action, so that the said spring may shift the aforesaid adjustable part at that time, substantially as described.

9. The combination, with the needle-operating mechanism having an adjustable part whose adjustment regulates the needle-stroke, of a clamp composed of two jaws on opposite sides of a piece connected with said adjustable part, and a mechanical device which forces said jaws together and restrains the movement of said adjustable part in both directions, substantially as described.

10. The combination, with the needle-operating mechanism comprising a rock-shaft provided with lever-arms, and a block adjustable lengthwise of one of said lever-arms, of a lever for adjusting said block on said arm, a link connecting the same with the block, and the controller-clamp composed of jaws on opposite sides of a piece connected with the said lever, and a mechanical device which forces said jaws together and thus retains the adjustable block in position, substantially as described.

11. The combination, with the needle-operating mechanism having an adjustable part whose adjustment regulates the needle-stroke, of an automatic intermitting clamp for retaining said part in position, substantially as described.

12. The combination, with the presser-foot, the needle-operating mechanism having an adjustable part whose adjustment regulates the needle-stroke, and the controller mechanism, of the means for preventing the accidental shifting of said controller mechanism, said means comprising the controller-clamping cam, clamping-jaws, and connection between the said cam and the said jaws, substantially as described.

13. The combination, with the presser-foot, the feed mechanism having the feed-surface on the opposite side of the work from said presser-foot, the needle-carrier also on the opposite side of the work from the said presser-foot, the needle-operating mechanism, and the presser-spring, of automatic mechanism, such as the extra-pressure cam and the lever operated thereby, which strongly compresses the said spring when the needles are thrust through the work and relieves the extra pressure during the action of the feed, substantially as described.

14. The combination of the presser-foot, the presser-spring connected at one end with said presser-foot, an adjustable hand-operated device at the opposite end of said presser-spring, a movable device bearing upon the presser-spring at an intermediate point, and a cam for acting upon said intermediate device to give an extra pressure to the presser-spring, substantially as described.

15. The combination, with the needle-carrier below the work-plate, the presser-foot above the same, the needle-operating mechanism having an adjustable part whose adjustment regulates the needle-stroke, and the controller mechanism connecting the presser-foot with said part, of the presser-spring and extra-pressure mechanism for applying the extra-pressure during the rise of the needle-carrier, substantially as described.

16. The combination, with the eye-pointed needle, the hook-needle, the needle-operating mechanism, the looper mechanism, the feed mechanism, and the tension apparatus, of the take-up and the take-up cam, the latter having a surface which moves the take-up in the direction to draw in the thread during the first part of the ascent of the needles and which goes out of action as the eye-pointed needle pushes the loop through the work, so that the take-up draws in thread during the first part of the needles' ascent, and ceases to do so during the latter part of such ascent, while the eye-pointed needle pushes the loop through the work, substantially as described.

17. The combination, with the eye-pointed needle, the hook-needle, the needle-operating mechanism, the looper mechanism, the feed mechanism, and the tension apparatus, of the take-up and the take-up cam, the latter having a portion which moves the take-up in the direction to draw in thread during the first part of the needles' ascent and a succeeding portion which moves it in the opposite direction during the latter part of such ascent, so that the take-up draws in the thread during the first part of the needles' ascent and gives it out during the latter part, while the eye-pointed needle pushes the loop through the work, substantially as described.

18. The combination, with the eye pointed needle, the hook-needle, the needle-operating mechanism, the looper mechanism, the feed mechanism, and the tension apparatus, of the take-up and the take-up cam, the latter having a portion which moves the take-up in the direction to give out thread during the latter part of the needles' ascent, while the eye-pointed needle pushes the loop through the work, and which is of such gradual inclination that the take-up gives up the thread less rapidly than the eye-pointed needle draws it in, so that the eye-pointed needle operates to tighten the stitch after the feed has gone out of action, substantially as described.

19. The combination, with the eye-pointed needle, the hook-needle, the needle-operating mechanism, the looper mechanism, the feed mechanism, and the tension apparatus, of the take-up and the take-up cam, the latter having a surface which controls the take-up during the latter portion of the needles' ascent and keeps the thread stretched for some time after the eye-pointed needle has reached the work and a succeeding surface which comes into action while the needles are near the top of their stroke and which is of such inclination as to release the thread by a quick movement, the result being that the said eye-pointed needle takes up slack while the thread is kept stretched, and the sudden release renders more certain the throwing of a loop for the looper mechanism, substantially as described.

20. The combination, with the eye-pointed needle, the hook-needle, the needle-operating mechanism, the looper mechanism, the feed mechanism, and the tension apparatus, of the take-up and the take-up cam, the latter having, first, an inclined surface which acts upon the take-up and draws in thread during the rise of the needles before they enter the work; second, a succeeding surface inclined in the same direction which draws in the loop pushed off the barb of the hook-needle as it enters the work; third, a succeeding surface inclined in the opposite direction which keeps the thread stretched while the eye-pointed needle pushes its loop through the work, and, fourth, a succeeding surface of greater inclination, but in the same direction as the preceding, which releases the thread preparatory to its being caught by the looper, substantially as described.

21. The combination, with the needle-carrier arranged below the work-plate, the eye-pointed and the hook needles mounted on said carrier, the needle-operating mechanism, the looper mechanism, and the main shaft from which said mechanism derives motion, of the take-up arranged below the work-plate and composed of a rock-shaft parallel with the main shaft, a lever-arm carried by said rock-shaft and provided with a thread-eye in proximity to the needles and also with an operating-lever arm, and the take-up cam mounted on the main shaft and engaging said operating-lever arm, substantially as described.

22. The combination, with a tension apparatus, of mechanism for intermittently releasing the tension thereof, said mechanism comprising a tension-cam adjustable within the machine and having a variable cam-surface with separate inclines for opening and closing the said apparatus, substantially as described.

23. The combination, with the feed mechanism having an adjustable part whose adjustment regulates the length of stitch, and the intermittent-tension apparatus having an adjustable part—such as an adjustable tension-cam with a variable cam-surface—whose adjustment regulates the period of holding and release of the tension, of an adjusting connection between the said adjustable parts—that is to say, a connection which is outside of or beyond the ordinary sewing machinery, and which makes the adjustment of said parts simultaneous, so that when the feed is changed there is a corresponding change in the intermittence of the tension, substantially as described.

24. The combination, with the eye-pointed needle, the hook-needle, the needle-operating mechanism, the looper mechanism, the feed mechanism, and the tension apparatus, of mechanism for intermittently releasing the tension of said apparatus, being timed to release the tension during the advance of the feed, and comprising a part adjustable to and operative in different positions within the machine, such as the sliding tension-cam, whose adjustment prolongs or shortens the period of such release, so that the feed mechanism may draw more or less thread from the spool according to the length of said period, substantially as described.

25. The combination, with the eye-pointed needle, the hook-needle, the needle operating mechanism, the looper mechanism, the feed mechanism having an adjustable part whose adjustment varies the length of stitch, and the intermittent-tension apparatus timed to release the tension during the advance of the feed, and comprising an adjustable part—such as the sliding tension-cam—whose adjustment regulates the duration of such release, of an adjusting-connection between the said adjustable parts, which connection effects a simultaneous adjustment of the said parts in the same direction—that is to say, the adjustment of the tension apparatus prolongs or shortens the release of the tension, as the adjustment of the feed mechanism lengthens or shortens the stitch, substantially as described.

26. The combination, with a take-up, of an intermittent tension apparatus timed to release the tension while the said take-up draws in thread and to reapply the same before the drawing-in operation ceases, and comprising an adjustable part—such as the tension-cam—whose adjustment regulates the duration of such release, and consequently the effective operation of the take-up, substantially as described.

27. The combination, with a feed mechanism and a take-up timed to draw in thread during the advance of the feed, of an intermittent-tension apparatus timed to leave the thread free during a portion of the drawing in by the take-up and of the advance of the feed and to reapply the tension thereto before the take-up ceases to draw in thread, and comprising an adjustable part whose adjustment regulates the duration of said release, substantially as described.

28. The combination, with the eye-pointed needle, the hook-needle, the needle-operating mechanism, the looper mechanism timed to operate when the needles are thrust through the work, the feed mechanism timed to advance the work when the needles are below the same, and the take-up timed to draw in thread while the needles are below the work and during the advance of the feed and to give it out as the eye-pointed needle pushes the loop through the work, of the intermittent-tension apparatus timed to release the tension during the advance movement of the feed and also during the drawing-in operation of the take-up and to restore the tension before the needles reach the top of their stroke, said intermittent-tension apparatus comprising an adjustable part—such as the tension-cam—whose adjustment regulates the duration of said release of the tension, substantially as described.

29. The combination of the eye-pointed needle, the hook-needle, the needle-operating mechanism, the looper mechanism, the feed mechanism having an adjustable part whose adjustment regulates the length of stitch, the intermittent-tension apparatus having an adjustable part—such as the tension-cam—whose adjustment regulates the periods of holding and release, the take-up, and the adjusting-connection between the said adjustable part of the feed mechanism and that of the intermittent-tension apparatus, the said take-up, feed mechanism, and intermittent-tension apparatus co-operating with each other and with the needles in drawing up and tightening the stitches formed by the joint operation of the needles, the looper mechanism, and the feed mechanism, and the said adjusting-connection effecting the adjustment of the said intermittent-tension apparatus at the same time with that of the said feed mechanism and to a corresponding extent, substantially as described.

30. The combination of the tension disks or washers, the screw-threaded tension-stud, the tension-spring, the nut, and the enveloping-sleeve, said nut engaging a screw-thread on said stud and having a slot-and-pin connection with said sleeve, said stud and said sleeve being both movable, and the tension-spring being interposed between the nut on the stud and a shoulder on the said sleeve, substantially as described.

31. In an intermittent tension, the combination, with the tension-spring, longitudinally-movable tension-disks, and nut, of the tension-stud having a screw-thread engaging said nut and projecting through the same, and reciprocatory device for operating the tension by striking the projecting end of said stud, substantially as described.

32. The combination, with an intermittent-tension apparatus comprising an adjustable part—such as the tension-cam—whose adjustment regulates the periods of holding and release, and an adjustable part—such as a movable bearing or point of resistance for one end of the tension-spring—whose adjustment regulates the degree of tension, of an adjusting-connection between said adjustable parts, so that their adjustment is simultaneously effected, and consequently the degree of tension regulated automatically when the periods of holding and release are altered, substantially as described.

33. The combination, with the feed mechanism comprising an adjustable part whose adjustment regulates the length of stitch and an intermittent-tension apparatus comprising two adjustable parts whose adjustment regulates, respectively, the periods of holding and release and the degree of tension, of an adjusting-connection between said three adjustable parts, so that the regulation of the length of stitch, the holding and release of the tension, and the degree of tension are simultaneously regulated, substantially as described.

34. The combination, with the eye-pointed needle, the hook-needle, the needle-operating mechanism, and the feed mechanism comprising an adjustable part whose adjustment regulates the length of stitch, of the intermittent-tension apparatus timed to release the tension during the operation of the feed and comprising adjustable parts whose adjustment regulates, respectively, the duration of such release and the degree of the tension, and the adjusting-connection between the said adjustable parts, whereby they are adjusted together in the directions described—that is to say, so as to prolong the duration of the release and to diminish the degree of tension simultaneously with an increase in the length of stitch, substantially as described.

35. The tension-cam, the variable feed-eccentric, and the shell of the tension apparatus, all connected together, in combination with the tension-spring, washers and stud of said tension apparatus, the lever for conveying motion to the stud from said cam, the feed-bar, and the devices for conveying motion to said feed-bar from said eccentric, substantially as described.

36. The feed mechanism comprising, in combination, a feed-bar provided with a feed-surface, a feed-rocker to the upper part of which the rear end of said feed-bar is hinged, an eccentric for raising and lowering the feed-surface, an adjustable eccentric for imparting a back-and-forth movement to the feed-surface, and connections between the eccentrics and said feed-bar, substantially as described.

37. The combination, with the feed mechanism having an adjustable eccentric for giving the back-and-forth feed movements, of a variably-intermittent tension having an adjustable operating-cam connected with said adjustable eccentric, substantially as described.

38. The combination, with the main shaft, of the feed-eccentric adjustable transversely on said shaft, the feed-slide adjustable longitudinally on the same, the lever for communicating the motion of the feed-slide to the eccentric, and the disk in which the said lever is fulcrumed, substantially as described.

39. The combination, with the feed-bar and the feed-eccentric adjustable transversely to the shaft, of the mechanical connections between the eccentric and feed-bar, said connections comprising an adjustable part—such, for example, as a lever with a movable fulcrum—connected with and regulated by the same device which shifts said eccentric, whereby the feed-surface is caused to rise in the same place whatever the length of stitch, substantially as described.

40. A feed mechanism comprising an adjustable part whose adjustment regulates the length of stitch, a body or mass movable in one direction under the influence of inertia, and an adjusting-connection between the said body or mass and the said adjustable part, so that by a force generated in running the said adjustable part may be automatically shifted and the length of stitch consequently altered, substantially as described.

41. The combination, with stitch-forming mechanism in a sewing-machine and a feeder or feed-surface for advancing the work, of mechanism for operating said feeder, said mechanism comprising an adjustable part whose adjustment regulates the length of stitch, a body or mass movable in one direction under the influence of inertia, an adjusting-connection between said body or mass and the said adjustable part, and an adjustable yielding device—such as the adjustable friction-clamp—which opposes the adjustment of the said part by the force due to the inertia of said mass or body, substantially as described.

42. The combination, with stitch-forming mechanism in a sewing-machine, of a feed mechanism comprising an adjustable part whose adjustment regulates the length of stitch, a mass or body movable in one direction under the influence of inertia, an adjusting-connection between said mass or body and the said adjustable part, which connection adjusts the said part in the direction to increase the length of stitch, and a friction-clamp set to resist the force due to the inertia at a lower and to yield to the same at a higher speed, substantially as described.

43. The combination, with a feeder or feed-surface, of reciprocatory parts including a lever through which movement is imparted to said feeder or feed-surface, feed-regulating devices which form a fulcrum to said lever, movable in the direction of the pull and thrust thereon, and whose position determines the length of feed movement, and a pawl connected with said devices and permitting the motion thereof in one direction only, substantially as described.

44. The combination of a feeder or feed-surface, reciprocatory parts for communicating motion to said feeder or feed-surface, feed-regulating devices connected with said parts and movable in the direction of the pull or thrust of said parts, mechanism for reciprocating said parts and reversing the motion more suddenly at one end than the other, and retaining or friction devices adjusted to hold said feed-regulating devices against the less sudden and allow it to be moved by the more sudden jerk due to said reversals, substantially as described.

45. The combination, with a feed mechanism comprising regulating devices whose position determines the length of stitch and a yielding friction-clamp which permits the said devices to be adjusted by the application of a sufficient force, but otherwise holds them in position, of an adjustable stop and its opposing device, one movable with the said regulating devices and the other stationary in the path of the former at the end of a free space through which motion is permitted, the adjustment of said stop being in the direction to bring it nearer to or farther from its opposing device, substantially as described.

46. The combination, with a feed mechanism comprising regulating devices which are automatically shifted by the machine in running and whose position determines the length of stitch, of an adjustable stop and its opposing device, one movable with the said regulating devices and the other stationary in the path of the former at the end of a free space through which motion is permitted, the adjustment of said stop being in the direction to bring it nearer to or farther from its opposing device, so as thereby to regulate the automatic shifting of the said regulating devices, substantially as described.

47. The combination, with, first, a feed mechanism comprising regulating devices whose position determines the length of stitch, of, second, a pawl and its ratchet or engaging-surface, one movable with the said regulating devices and the other stationary, and, third, an adjustable stop and its opposing device, one movable with said regulating devices and the other stationary in the path of the former on that side of the same toward which motion is permitted by said pawl, substantially as described.

48. The combination, with the feed-bar, a lever connected therewith, and the eccentric and short strap for communicating motion to said feed-bar through said lever, of the adjusting devices for controlling the stroke of said feed-bar, connected with said lever, and movable in the direction of the pull or thrust in feeding, so that the resistance of said feed-bar tends to shift said adjusting devices, substantially as described.

49. The combination of the adjustable feed-eccentric, the feed-slide connected therewith, the lever for moving said slide, the pawl in the handle of said lever, and the friction-washer for pressing on said lever, of the feed-bar, the lever connected therewith, the short strap connecting said last-named lever with the said eccentric, and the link connecting it with the lever for moving the feed-slide, substantially as described.

50. The combination, with a feed mechanism having adjustable devices for controlling the length of stroke and a movable part which in running tends to shift said devices in the direction to increase the stroke, of friction devices whose resistance withstands this tendency at a low speed, but is overcome thereby at a higher speed, and a pawl for preventing movement of the aforesaid adjustable devices in the direction to shorten the stroke, substantially as described.

51. The combination, with a feed mechanism having feed-regulating devices whose position determines the length of stitch and a friction-clamp for applying a yielding resistance to the movement of said devices, of an adjustable stop composed of a pin, in conjunction with a series of holes, in one or another of which it may be set, said stop permitting the movement of said devices up to a certain limit, depending on the position of said pin, but automatically arresting the motion when said limit is reached, substantially as described.

52. In a sewing-machine having the work-plate projecting beyond the main part of the machine-frame, and in combination with said work-plate, the needle-carrier provided at its upper end with a bracket which projects outward under the work-plate and has a needle-clamp at the outer end thereof, substantially as described.

53. In a sewing-machine having a projecting work-plate, and in combination with said work-plate, the needle-carrier having the needle-clamp at the outer end of a bracket which is fastened at the upper end of said carrier and projects outwardly under the work-plate, and the feed-bar having the feed-surface carried by a projection which extends laterally under said work-plate, substantially as described.

54. In a sewing-machine having a projecting work-plate, and in combination with said work-plate, the needle-carrier having a bracket under the work-plate and the needle-clamp at the outer end of the bracket, the feed-bar having a lateral projection under the work-plate and the feed-surface at the outer end of said projection, and the horizontal presser-arm having a lateral projection at the end thereof and the presser-foot attached to said projection, substantially as described.

55. The combination, with the eye-pointed needle and the hook-needle, of the looper and the threader arranged inside of the path of said needles, and means for operating the needles, the looper, and the threader in due sequence, said threader being movable outwardly at the bottom for carrying the thread between the needles, substantially as described.

56. The combination, with the eye-pointed needle, the hook-needle, and the threader having a finger at its lower end, of the rock-shaft, the lever-arm carried by said rock-shaft and pivoted to said threader, and the guide-arm hinged to the threader and to a support and arranged relatively to the said lever-arm as specified, so that the lower end of said threader is moved in and out by the vibration of said rock-shaft, substantially as described.

57. The combination, with the presser-foot, the support therefor, and the work-guide, of the screw passing through or into said support, said presser-foot, and said work-guide, and detachably connecting the three together, and the means whereby the said work-guide is adjusted laterally with respect to said presser-foot, substantially as described.

58. The combination, with the support for the presser-foot, of the work-guide, the presser-foot upheld by said guide, the screw tapped into said guide and passing through the support, the means—such as a lever—for adjusting the position of the guide, and the means—such as a projection fitting in a recess—for preventing the movement of the presser-foot, substantially as described.

59. The combination, with the presser-foot, of the laterally-adjustable work-guide attached to said presser-foot, so as to be raised and lowered with the same, and provided on the bottom with a narrow projecting rib parallel with the line of stitching for bearing on the inner portion of a braid, the guiding-edge being on the side of the said rib adjacent to the needle, and a vacant space due to said rib being left under the said work-guide on the opposite side of said rib from the needle, substantially as described.

60. The combination, with the presser-foot having on the bottom a rib parallel with the line of stitching on one side of the needle-hole, of a laterally-adjustable work-guide having a similar rib on the opposite side of said needle-hole, substantially as described.

61. The combination, with the presser-foot having a wide front part or toe in front of and on both sides of the needle-hole, of a work-guide provided with a separator and having the front part or toe, which is to one side of said separator and underlies the toe of the presser-foot, of corresponding width, substantially as described.

62. The looper provided with a hook and also with a vertical wall inside of said hook, the looper being recessed behind the said wall, in combination with the threader having a finger and mechanism which operates said looper and threader in due sequence and causes said finger to travel outward through said recess, and in combination, also, with the eye-pointed and the hook needle, substantially as described.

63. In a sewing-machine, the presser-arm hinged to the machine-frame at the rear thereof on an axis transverse to the line of stitching, and provided at the front end with a lateral projection forming a support to the presser-foot, in combination with the presser-foot, the eye-pointed needle, the hook-needle, and the looper and threader, said looper and threader carried by and movable with said arm, substantially as described.

64. The presser-arm hinged to the machine-frame at the rear thereof, in combination with the looper, the threader, and their operating rock-shafts journaled in said arm, the looper-shaft being transverse to the length of said presser-arm and the threader-shaft parallel with the same, substantially as described.

65. The combination, with the looper mechanism, of the hook-needle having a flattened shank, the eye-pointed needle, also having a flattened shank, the needle-carrier, and the clamps for attaching the needles thereto, the flattened portions of said shanks being on their adjacent sides, substantially as described.

66. The combination, with the hook-needle and the eye-pointed needle, of the needle-carrier having a mid-feather to fit between the needles, and clamps with jaws connected by a screw, so that both needles are clamped or unclamped at the same time, said needles each having the shank flattened on the side adjacent to said mid-feather, and said jaws having each a notch for engaging the opposite cylindrical side of the shank, substantially as described.

67. The combination, with the needle-carrier and a needle, of a notched jaw for clamping said needle, said jaw having its upper part equal in width to the diameter of the needle-shank and being placed in front of or behind the needle, and a feed mechanism arranged with its feed-surface alongside of and in close proximity to the path of said needles, substantially as described.

68. The combination, with the presser-arm and presser-foot and the looping mechanism carried thereby, of the cam for lifting the presser-foot and the vertically-adjustable stud on which said cam turns, substantially as described.

69. The combination, with the hook-needle, the eye-pointed needle, the needle-operating mechanism, the feed, and the looper mechanism, of the presser-arm, the presser-foot, and work-guide removably attached to a lateral projection on said arm by a screw passing through the said projection and the said presser-foot and into the said work-guide, and the guide for the entering braid, substantially as described.

70. The combination, with the braid-guide movable to adjust the distance of its guiding-edge from the line of sewing, of an adjustable stop and its opposing device, one movable with the braid-guide and the other stationary in the path of the former, the adjustment of said stop being in the direction to bring the same nearer to or farther from said opposing device, substantially as described.

71. The combination, with the braid-guide and its carrier, of the adjustable stop set in a slot on the braid-guide and held in place by a screw, and a projection on the carrier arranged in the path of said stop, substantially as described.

72. The adjustable guide for the entering braid, having its guiding-edge to the right of the line of sewing immediately above the work-plate, in combination with, first, the carrier therefor movable in the same direction and mounted on the machine-frame to the right of the work-plate, the said guide being mounted on the carrier and adjustable independently thereof; second, means for adjusting said carrier on the frame, and with it the braid-guide carried thereby, and, third, separate means for adjusting the braid-guide indpendently on its said carrier, substantially as described.

73. The combination, with the machine-frame and the work-plate, of the carrier-slide mounted in ways of said frame, the friction devices for holding it in place, the hand devices for moving the carrier-slide against said friction, the guide for the entering braid mounted in ways of said carrier and having its guiding-edge above said work-plate, the friction devices for holding said guide in place, and the hand device for moving the guide against the friction, substantially as described.

74. The combination, with the adjustable carrier-slide and the braid-guide adjustable on said slide, of the lever for shifting the slide and the adjustable stop for limiting the movement of said lever, substantially as described.

75. The combination, with the stationary guide-pin, of the adjustable braid-guide having therein holes for receiving said pin, and the stationary post having holes in line with those on the said guide for the same purpose, the said guide-pin being secured in one of the holes in said post and fitting in the corresponding hole in the guide and being adjustable by placing the same in a different pair of holes, substantially as described.

76. The combination, with the adjustable braid-guide for the inner edge of braid, of the adjustable guide for the outer edge of the said braid, having a toothed stem which fits in a hole in the first-named braid-guide, and the shaft journaled in the said braid-guide and provided with a pinion which meshes with said stem for adjusting said outer edge guide, substantially as described.

77. The combination, with the machine-frame and the projecting work-plate, of the needle-carrier having the needle-clamp at the outer end of a bracket, the feed-bar having the feed-surface at the outer end of a lateral projection, the presser-arm having the presser-foot at the outer end of a lateral projection, the work-guide adjustably secured to the projection of the presser-arm, the braid-guide attached adjustably to the carrier-slide to the right of said work-plate, and the carrier-slide adjustably secured on the front of the machine-frame, substantially as described, whereby the parts of the machine necessarily grouped about the work-plate are mainly placed or supported to the right of and below the same, as set forth.

78. The combination, with the needles, the needle-carrier, the needle-operating mechanism, the feed mechanism, and the looper mechanism, of the intermittent-tension apparatus comprising the adjustable tension-cam provided with inclines thereon, which temporarily release the tension once when the looper mechanism comes into action and a second time during the advance movement of the feed, the distance between the inclines which open and close the tension apparatus at the time of said second release being variable, and the adjustment of said cam regulating said distance, so as to increase or diminish the duration of said release, substantially as described.

79. The feed-bar and feed-rocker, the former having its pivot behind that of the latter, so that the rear end of the feed-bar is carried down when the feed-surface advances, in combination with the mechanism for giving a rising-and-falling and back-and-forth movement to said feed-surface, substantially as described.

80. The combination, with the feed-bar and the needle-carrier, of the eccentrics and connections for operating the needle-carrier and feed-bar, said connections including eccentric-straps pivoted close to the eccentrics, so as to constitute short links, and said eccentrics and straps being arranged, as described, so that the needle-eccentric is on the opposite side of the shaft from the pivot of the eccentric-strap when the needle-carrier is at the bottom of its stroke and the feeding-eccentric is in a corresponding position when the feed-bar is nearest the front of the machine, substantially as set forth.

81. The combination, with the horizontal feed-bar and the upright feed-rocker, of the feed-lifting eccentric, the strap encircling the same and connected with the feed-bar, the feed-eccentric for giving back and forth movements, and the strap encircling the same connected with the feed-bar and having its pivot behind the shaft, substantially as described.

82. The combination of the feed-bar, the feed-rocker, the feed-lifting eccentric, its strap, the adjustable feed-eccentric, its strap, the upright lever pivoted to and supported by the feed-bar, and pivoted also to the last-named strap, the adjusting-lever connected by a link with the lower end of said upright lever, the feed-slide connected with the adjusting-lever, and the connection between the feed-slide and the adjustable feed-eccentric for changing the position of the same, substantially as described.

83. The combination of the needle-eccentric, its strap, the guide-arm, the link, the adjustable block connected by a journal-pin with the lower end of said link, the rock-shaft having an arm on which said block is adjustable, and the needle-carrier connected with and operated by a lever-arm at the opposite end of the rock-shaft, substantially as described.

84. The herein-described improved sewing-machine, comprising, in combination, the machine-frame, the main shaft, the needle-eccentric, the take-up cam, the tension-cam and feed-slide, the looper-cam, the threader-cam, the adjustable feed-eccentric, the feed-lifting eccentric, all on said shaft, the needles and needle-carrier, the mechanism for communicating motion from the needle-eccentric to the needle-carrier, the same having a part adjustable to vary the stroke of said carrier, the presser-arm, the controller mechanism connecting said presser-arm with said adjustable part, the looper, the threader, the connections between the same and their respective cams, the feed-bar, feed-rocker, connections between the feed-bar and feed-eccentrics, the connections between the adjustable feed-eccentric and the feed-slide, the lever for adjusting said tension-cam and feed-slide, the tension mechanism operated by said tension-cam, and the take-up, said cams and eccentrics being arranged or timed to operate in the manner set forth.

85. In a straw-sewing machine, the combination, with the work-plate, eye-pointed needle, hook-needle, needle-operating mechanism having an adjustable part, the controller mechanism, and the looper mechanism, of the removable presser-foot and the removable and adjustable work-guide, and the presser-arm supporting said presser-foot and work-guide, said controller mechanism connecting the presser-arm with the adjustable part of the needle-operating mechanism, substantially as described.

86. The combination, with the presser-foot and presser-arm, the needle-operating mechanism having a part adjustable to change the needle-stroke, and the controller mechanism connecting the presser-foot with said adjustable part and having a loose joint, of the spring connected with the presser-arm, so as to move with it, and bearing at the opposite end against the controller mechanism and tending to maintain the parts of the loose joint in contact, substantially as described.

87. The combination, with the main shaft, the presser-arm hinged at the rear to the machine-frame, and the looper and the threader carried by said arm, of the cam, upright lever, horizontal link, and rock-shaft transverse to the presser-arm for operating said looper, and the cam, horizontal lever, and upright link and rock-shaft lengthwise of said presser-arm for operating said threader, the joint between the lever and link for operating the looper being behind the main shaft and in front of the axis upon which the presser-arm turns, and the joint between the lever and link for operating the threader being arranged above and in close proximity to said axis, substantially as described, so that the timing of the looper and threader is kept constant notwithstanding the raising and lowering of the presser-foot, as set forth.

88. The combination, with the main shaft, the feed-eccentric adjustable transversely on said shaft, and the feed-slide movable lengthwise of said shaft, of the lever having at the ends balls fitting within holes in said eccentric and slide, respectively, and the disk within which the said lever is fulcrumed, substantially as described.

89. The combination, with the tension apparatus and a lever for opening the same intermittently, of the adjustable tension-cam having in the periphery a variable cam-surface against which the end of said lever bears, the adjustment of said cam changing the bearing-point of said lever on the cam, and thereby regulating the time or times during which the tension is held open, substantially as described.

90. The machine-frame provided with a hinged cover and supporting the stitch-forming mechanism, and the work feeding and guiding mechanism, in combination with a base provided with a raised border, so as to retain oil, and having at the back hollowed bosses in which rounded projections on the machine-frame fit, substantially as described.

In testimony whereof we have signed this specification in the presence of two subscribing witnesses.

CHAS. H. WILLCOX.
GEORGE H. NOBLE.

Witnesses:
CHARLES RICHARDS,
CALVIN HOLLAND.